US009693246B2

(12) United States Patent
Gong et al.

(10) Patent No.: US 9,693,246 B2
(45) Date of Patent: Jun. 27, 2017

(54) METHOD AND APPARATUS FOR PRESENTING INDOOR TRAFFIC MAP

(71) Applicant: HUAWEI TECHNOLOGIES CO., LTD., Shenzhen, Guangdong (CN)

(72) Inventors: Lanping Gong, Shenzhen (CN); Qiaoming Zhang, Shenzhen (CN); Xufeng Chen, Shanghai (CN); Bo Wang, Shenzhen (CN); Haiyang Sun, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 29 days.

(21) Appl. No.: 14/466,288

(22) Filed: Aug. 22, 2014

(65) Prior Publication Data

US 2014/0363156 A1 Dec. 11, 2014

Related U.S. Application Data

(63) Continuation of application No. PCT/CN2012/084938, filed on Nov. 21, 2012.

(30) Foreign Application Priority Data

Feb. 24, 2012 (CN) .......................... 2012 1 0043370

(51) Int. Cl.
*H04B 10/079* (2013.01)
*H04W 24/08* (2009.01)
(Continued)

(52) U.S. Cl.
CPC ........ *H04W 24/08* (2013.01); *H04B 10/0793* (2013.01); *H04B 10/0795* (2013.01);
(Continued)

(58) Field of Classification Search
None
See application file for complete search history.

(56) References Cited

U.S. PATENT DOCUMENTS 5,355,375 A 10/1994 Christensen

FOREIGN PATENT DOCUMENTS

| CN | 101119149 A | 2/2008 |
|---|---|---|
| CN | 101426206 A | 5/2009 |

(Continued)

OTHER PUBLICATIONS

PCT International Search Report issued on Mar. 7, 2013 in corresponding International Patent Application No. PCT/CN2012/084938.

(Continued)

Primary Examiner — Darren E Wolf
(74) Attorney, Agent, or Firm — Staas & Halsey LLP

(57) ABSTRACT

Embodiments of the present invention relate to a method and an apparatus for presenting an indoor traffic map. The method includes: sending, by a near-end unit of an indoor distribution system, a pseudo carrier to a polled remote unit according to a pre-established polling routing table; receiving operating data collected by the remote unit and a measurement report reported by the terminal; determining traffic map data of the polled remote unit; determining whether the traffic map data meets a traffic map presenting condition, and presenting an indoor traffic map when the traffic map presenting condition is met. In the present invention, remote units are polled sequentially by using a pseudo carrier and a polling routing table, operating data of the remote unit and a measurement report of the terminal are obtained as traffic map data, to perform representation of a traffic map.

18 Claims, 9 Drawing Sheets

(51) Int. Cl.
*H04W 24/10* (2009.01)
*H04W 16/20* (2009.01)
*H04W 4/04* (2009.01)
*H04W 4/02* (2009.01)

(52) U.S. Cl.
CPC ........... *H04W 4/043* (2013.01); *H04W 16/20* (2013.01); *H04W 24/10* (2013.01); *H04W 4/02* (2013.01)

(56) References Cited

FOREIGN PATENT DOCUMENTS

| | | |
|---|---|---|
| CN | 101453747 A | 6/2009 |
| CN | 101568127 A | 10/2009 |
| CN | 102612071 A | 7/2012 |

OTHER PUBLICATIONS

International Search Report mailed Mar. 7, 2013, in corresponding International Patent Application No. PCT/CN2012/084938.

METHOD AND APPARATUS FOR PRESENTING INDOOR TRAFFIC MAP

CROSS-REFERENCE TO RELATED APPLICATION

This application is a continuation of International Application No. PCT/CN2012/084938, filed on Nov. 21, 2012, which claims priority to Chinese Patent Application No. 201210043370.4 filed on Feb. 24, 2012, both of which are hereby incorporated by reference in their entireties.

TECHNICAL FIELD

The present invention relates to the field of mobile communication, and in particular, to a method and an apparatus for presenting an indoor traffic map.

BACKGROUND

With continuous development of 2G, 3G, and 4G wireless communications technologies, people's requirements for data services continuously grow. In addition, as mobile users increase rapidly and more and more high-rise buildings are built, traffic density and coverage requirements also continuously grow. These buildings have a large scale and good quality, and have a strong shielding effect on mobile phone signals. Under circumstances of lower floors, underground shops, and underground parking of a large building, mobile communication signals are weak, mobile phones cannot work properly, and coverage holes and shadow regions of mobile communication are formed; on intermediate floors, because signals from different surrounding base stations are overlapped, ping-pong handovers occur, and the mobile phones frequently perform handovers and even drop calls, which seriously affect normal usage of the mobile phones; and on top floors of the building, because of a limitation of a height of a base station antenna, the top floors cannot be normally covered, and also become coverage holes of mobile communication. In addition, in some buildings, although a mobile phone can make calls normally, user density is high, a base station channel is congested, and it is difficult for the mobile phone to be online. Network coverage, network capacity, and network quality fundamentally embody a service level of a mobile network, and are subjects of all mobile network optimizations.

A conventional indoor distribution system can hardly bear requirements of multiple bands, multiple modes, multiple operators, and large capacity. A multi-band multi-mode digitized optical fiber distribution system, as an evolution form of a new-generation indoor coverage system, is more becoming one of mainstream indoor coverage solutions.

However, the digitized optical fiber distribution system may interfere with a receiver because of a complex electromagnetic environment, second-order and third-order intermodulation caused by co-site of multiple operators, and pulse spectrums caused by turning on or off of other electronic devices, and has a large positioning difficulty. An antenna is usually close to a human body and other indoor power-supply devices, which easily causes uplink blocking indoors. Generally, a base station covers more than ten floors, and cannot monitor every floor. Traffic volumes on different floors are different because of different functional zones, and traffic distribution is uneven. Pilot pollution near a window on a high floor cannot be positioned well. Because of these features of the digitized optical fiber distribution system, it is urgent to know an accurate indoor traffic map.

However, a current traffic map mainly focuses on coverage of outdoor macro base stations. A core of a traffic map technology is positioning and information mining of a measurement report, and a traffic map, a coverage map, an interference map, and a power-control map defined by a user are obtained on this basis, and a value-added point (VAP) distribution map or a call-drop map may be presented in combination with call history record (CHR) information, where complex calculation is required.

Regarding the multi-band multi-mode digitized optical fiber distribution system, in the prior art, statistics are collected by placing indoors a pico base station (PICO) or a terminal at a fixed point, but this manner, featuring a too large granularity, is impractical, and an actual situation cannot by accurately reflected. Therefore, the current multi-band multi-mode digitized optical fiber distribution system does not have an accurate indoor traffic map.

SUMMARY

Embodiments of the present invention relate to a method and an apparatus for presenting an indoor traffic map, where remote units are polled by using a polling routing table, traffic map data is obtained by using a pseudo carrier, to implement representation of a traffic map.

One aspect of the present invention provides a method for presenting an indoor traffic map, where the method includes:

sending, by a near-end unit of an indoor distribution system, a pseudo carrier to a polled remote unit according to a pre-established polling routing table, so that the remote unit sends the pseudo carrier to a terminal;

receiving operating data collected by the remote unit and a measurement report reported by the terminal, where the measurement report includes information of the pseudo carrier;

determining traffic map data of the polled remote unit according to the measurement report or the collected operating data; and determining whether the traffic map data meets a traffic map presenting condition, and presenting an indoor traffic map when the traffic map presenting condition is met.

One aspect of the present invention provides an apparatus for presenting an indoor traffic map, where the apparatus includes:

a sending unit, configured to send a pseudo carrier to a polled remote unit according to a pre-established polling routing table, so that the remote unit sends the pseudo carrier to a terminal;

a receiving unit, configured to receive operating data collected by the remote unit and a measurement report reported by the terminal, where the measurement report includes information of the pseudo carrier;

a determining unit, configured to determine traffic map data of the polled remote unit according to the measurement report and the collected operating data; and a presenting unit, configured to determine whether the traffic map data meets a traffic map presenting condition, and present an indoor traffic map when the traffic map presenting condition is met.

In the present invention, remote units are polled sequentially by using a polling routing table, a location of a terminal in a coverage range of a remote unit is determined by using a pseudo carrier, operating data of the remote unit and a measurement report of the terminal are obtained as traffic map data, and an indoor traffic map is presented. Therefore, there is no need to obtain a measurement report of a terminal covered by an outdoor macro base station to perform complex calculation, and there is no need to manually place indoors a pico base station or a terminal at a fixed point for collecting statistics to obtain a traffic map.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person skilled in the art may still derive other drawings from these accompanying drawings.

DESCRIPTION OF EMBODIMENTS

The technical solutions of the present invention are further described hereinafter in detail with reference to the accompanying drawings and embodiments.

In the embodiments of the present invention, operating data of a remote unit and a measurement report of a terminal in a coverage range of the remote unit are obtained by using an established polling routing table and a pseudo carrier, traffic map data is formed, to implement representation of a traffic map.

Figure 1:
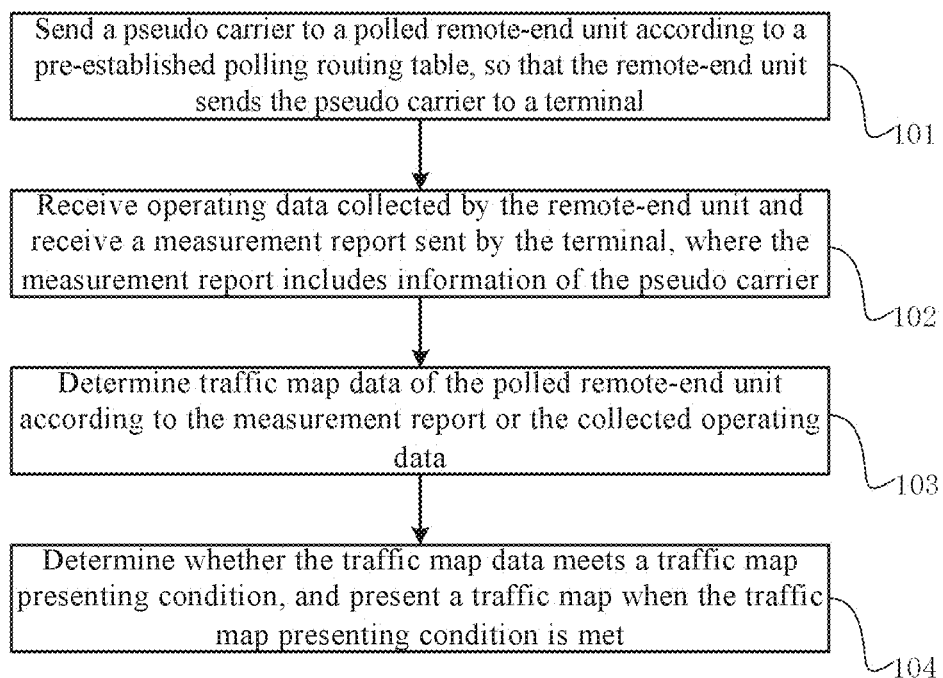
FIG. 1 is a flowchart of a method for presenting an indoor traffic map according to an embodiment of the present invention.

FIG. 1 is a flowchart of a method for presenting an indoor traffic map according to an embodiment of the present invention. This embodiment is executed by a near-end unit of an indoor distribution system. The embodiment may include the following steps:

Step 101: The near-end unit of the indoor distribution system sends a pseudo carrier to a polled remote unit according to a pre-established polling routing table, so that the remote unit sends the pseudo carrier to a terminal.

Specifically, the near-end unit (or a master unit) may query a database that stores indoor distribution locations of remote units, and establish the polling routing table according to the database in combination with identification numbers (IDs) of the remote units, where the polling routing table records a mapping relationship between an indoor distribution location of each remote unit and a remote unit ID. The polling routing table may indicate a sequence in which the remote units are polled, and then a pseudo carrier is sent to each polled remote unit according to the polling sequence.

It should be understood that, the polling routing table includes a correspondence between the master unit and remote units, or includes a correspondence between the master unit and an expansion unit and remote units. The correspondence between the master unit and remote units or the correspondence between the master unit and the expansion unit and remote units in the polling routing table are assigned in the indoor distribution system at the beginning of overall arrangement.

Figure 8:
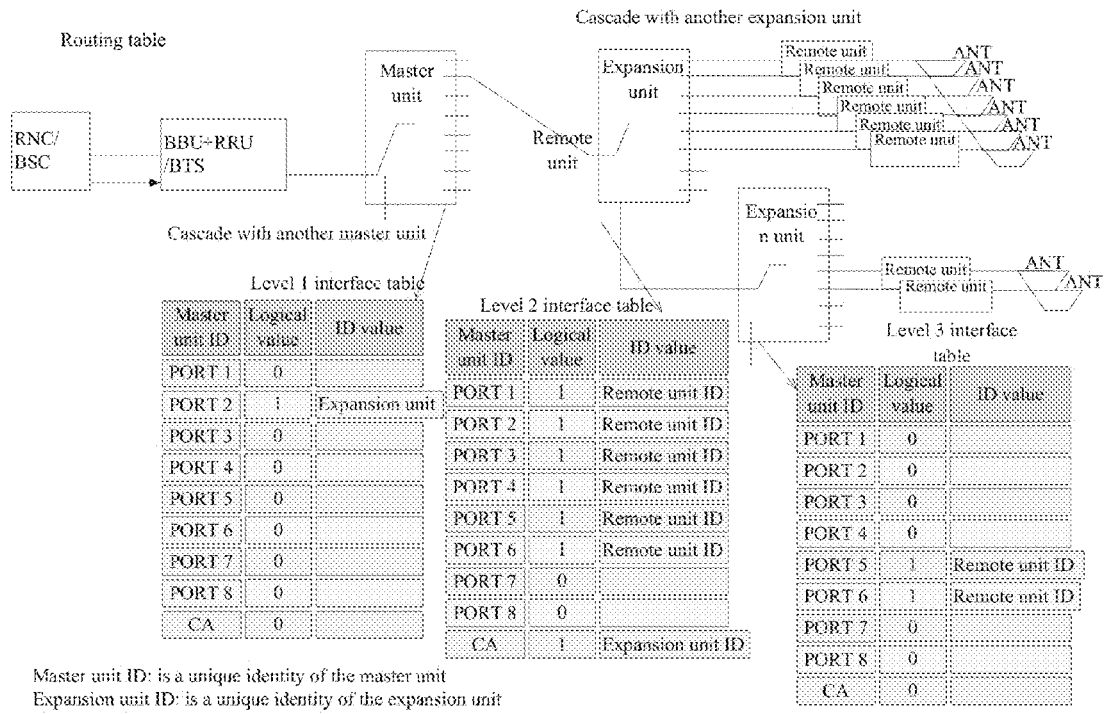
FIG. 8 is a flowchart of a polling routing table according to an embodiment of the present invention.

The polling routing table is shown in FIG. 8. FIG. 8 is a schematic diagram of a routing table in the method according to the embodiment of the present invention. As shown in FIG. 8, the near-end unit (master unit) includes a level 1 interface table, and sequentially connected expansion units include a level 2 interface table, a level 3 interface table, and so on. The level 1 interface table includes a near-end unit (master unit) identity ID, a logical value, and an ID value; and the level 2 interface table includes an expansion unit ID, a logical value, and an ID value. The near-end unit (master unit) ID is a unique identity of the near-end unit, and the expansion unit ID is a unique identity of the expansion unit.

Associated data between the remote units and physical locations is shown in Table 1:

TABLE 1

Associated data between remote units and physical locations

| Remote unit ID | Floor Number | Location | Location Feature Description |
| --- | --- | --- | --- |
| Remote unit ID | 5 | Coordinates | For example, near a window, using a directional antenna |
| Remote unit ID | 5 | Coordinates | |
| Remote unit ID | 5 | Coordinates | |
| Remote unit ID | 5 | Coordinates | |
| Remote unit ID | 5 | Coordinates | |
| Remote unit ID | 5 | Coordinates | |
| Remote unit ID | 4 | Coordinates | |
| Remote unit ID | 4 | Coordinates | |

That the master unit sends a pseudo carrier to a polled remote unit may include: after establishing a link through a carrier channel between a base station, the master unit, and the remote unit, sending, by the master unit, the pseudo carrier to the polled remote unit; or sending, by the master unit, the pseudo carrier to the polled remote unit through a carrier channel between a base station, the master unit, the expansion unit, and the remote unit.

Step 102: The near-end unit of the indoor distribution system receives operating data collected by the remote unit and receives a measurement report sent by the terminal, where the measurement report includes information of the pseudo carrier.

The measurement report may be reported by the terminal to the base station, and then sent by the base station to the near-end unit. The base station initiates measurement for the terminal by using an RNC, and feeds back the measurement report to the near-end unit. In addition to the information of the pseudo carrier reported by each terminal, the measurement report obtained by the RNC by measuring the terminal may further include other network measurement information, for example, received field strength of a link-established terminal in a coverage area of each remote unit, terminal signal quality such as a signal-to-noise ratio (SNR) or an ratio Ec/Io of chip energy to interference power, neighboring cell pilot signal strength, and neighboring base station pilot signal strength. Optionally, the measurement report may be reported by the terminal directly to the near-end unit.

Further, the measurement report may further include identity information of the terminal. A link-establishing traffic data statistic may be obtained by using the identity information of the terminal and the information of the pseudo carrier.

Therefore, the link-establishing traffic data statistic of the polled remote unit may be obtained in the following manner: obtaining, from the base station according to the identity information of the terminal included in the measurement report, a traffic volume corresponding to the identity information of the terminal, namely, obtaining, from the base station according to the identity information of the terminal, a traffic volume of the terminal covered by the polled remote unit; and obtaining a statistic traffic volume of the polled remote unit according to the traffic volume of each terminal covered by the polled remote unit. Specifically, when the base station interacts with the terminal, the base station may obtain the traffic volume corresponding to each terminal. For example, the base station can learn that: a terminal 1 corresponds to a traffic volume 1, a terminal 2 corresponds to a traffic volume 2, a terminal 3 corresponds to a traffic volume 3, and so on. The near-end unit may obtain the traffic volume corresponding to each terminal from the base station, but at this time, the near-end unit does not know which remote unit covers which terminal, and does not know the traffic volume of each remote unit. After the near-end unit receives the measurement report sent by the terminal, if the received measurement report includes the information of the pseudo carrier, it may indicate that the terminal that sends the measurement report is covered by the polled remote unit, and then, the link-establishing traffic data statistic of the polled remote unit is obtained according to the traffic volume corresponding to the terminal covered by the polled remote unit. For example, a measurement report reported by the terminal 1 includes the information of the pseudo carrier, a measurement report reported by the terminal 2 does not include the information of the pseudo carrier, and a measurement report reported by the terminal 3 includes the information of the pseudo carrier, it indicates that the terminal 1 and the terminal 3 are covered by the polled remote unit, and that the terminal 2 is not covered by the polled remote unit. The near-end unit may obtain the traffic volume 1 corresponding to the terminal 1 and the traffic volume 3 corresponding to the terminal 3 from the base station. Then, the base station may obtain the statistic traffic volume of the polled remote unit according to the traffic volumes corresponding to the terminals covered by the polled remote unit. For example, an addition operation may be performed for the traffic volume 1 and the traffic volume 3 to obtain the statistic traffic volume of the polled remote unit, or, corresponding conversion processing may be performed for the traffic volume 1 and the traffic volume 3 according to a conversion manner specified in advance, to obtain the statistic traffic volume of the polled remote unit, thereby obtaining the link-establishing traffic data statistic.

The near-end unit sends the pseudo carrier to the polled remote unit according to the pre-established polling routing table, and also triggers the remote unit to collect operating data of the remote unit. The operating data collected by the remote unit includes: a received field strength size of the remote unit such as received total wideband power (RTWP) and received signal strength (RSSI), and uplink spectrum data of the remote unit.

Specifically, after receiving the pseudo carrier, the remote unit obtains statistic power which is analog-to-digital converted by a receiver of the remote unit, converts a value of the statistic power into an antenna port, and sends received field strength (RSSI or RTWP) of the remote unit to the near-end unit by using the antenna port. The remote unit may also perform spectrum scanning on an idle carrier channel of the remote unit to obtain spectrum data, and then send the spectrum data to the near-end unit by using the antenna port. Thereby, the near-end unit obtains the received field strength (RSSI or RTWP) and the spectrum data of the remote unit from the antenna port.

Step 103: Determine traffic map data of the polled remote unit according to the measurement report or the collected operating data.

Specifically, the near-end unit may determine the traffic map data of the polled remote unit according to the measurement report of the terminal or the operating data collected by the remote unit. For example, when presenting a weak-coverage indoor traffic map is required, a terminal received field strength size and terminal signal quality in the measurement report are determined to be the traffic map data; when presenting an interference indoor traffic map is required, received field strength size information of the remote unit and uplink spectrum information of the remote unit included in the collected operating data are determined to be the traffic map data; when presenting a traffic alarm indoor traffic map is required, a link-establishing traffic data statistic is obtained by calculation according to a terminal identity and information of the pseudo carrier in the measurement report, and the link-establishing traffic data statistic is determined to be the traffic map data; when presenting a pilot pollution traffic map is required, neighboring cell pilot signal strength in the measurement report is determined to be the traffic map data; and when presenting a signal leaking traffic map is required, neighboring base station pilot signal strength information in the measurement report is determined to be the traffic map data.

Step 104: Determine whether the traffic map data meets a traffic map presenting condition, and present a traffic map when the traffic map presenting condition is met.

The traffic map presenting condition is set to include a weak-coverage determining condition, an uplink interference determining condition, a traffic alarm determining condition, a pilot pollution determining condition, and a signal leaking determining condition.

The weak-coverage determining condition is: determining whether the terminal received field strength size of a terminal in a coverage area of the remote unit is lower than a grid field strength key performance indicator (KPI) value of each grid divided in the area; and determining whether signal quality of these terminals is lower than a set level.

The uplink interference determining condition is: determining whether the received field strength size information of the remote unit is higherhigher than a set threshold; and determining whether the uplink spectrum data of the remote unit is higher than a spectrum data threshold.

The traffic alarm determining condition is: determining whether the link-establishing traffic data statistic exceeds a set threshold.

The pilot pollution determining condition is: determining whether a difference between the neighboring base station pilot signal size of the terminal in the coverage area of the remote unit and a dominant pilot signal size of a current base station is lower than a set threshold; and determining whether the terminal signal quality is lower than a set level.

The signal leaking determining condition is: determining whether the neighboring cell pilot signal strength of the terminal in the coverage area of the remote unit exceeds a set threshold, and whether the number of neighboring cell pilot signals with strength exceeding the threshold exceeds a set number.

When all the foregoing conditions are met, these terminals in the coverage area of the remote unit or the remote unit is presented on a field strength KPI grid graph of an antenna arrangement diagram of the indoor distribution system by, for example, dotting, marking with colors, or using light and dark colors.

Preferably, before the determining whether the traffic map data meets a traffic map presenting condition in step 104, the method may further include determining location information of the terminal in the coverage range of the remote unit according to the information of the pseudo carrier included in the measurement report, and step 104 is specifically: determining whether the traffic map data meets a traffic map presenting condition, and when the traffic map presenting condition is met, presenting the indoor traffic map according to the location information of the terminal in the coverage range of the remote unit. Thereby, the indoor traffic map may be presented according to a location of a corresponding terminal in the coverage range of the remote unit, and weak-coverage, traffic alarm, and pilot pollution indoor traffic maps are displayed in the range of the remote unit by random dotting.

In the embodiment of the present invention, a near-end unit interacts with a remote unit, so that the remote unit sends a pseudo carrier to a terminal, and traffic map data of a plurality of terminals in a coverage range of the remote unit is obtained by using the pseudo carrier, thereby implementing presentation of an indoor traffic map. Therefore, different from the prior art, there is no need to firstly obtain a measurement report of a terminal covered by an outdoor macro base station, and then obtain a traffic map in combination with all types of data such as a call history record, and there is no need to manually place indoors a pico base station or a terminal at a fixed point for collecting statistics to obtain a traffic map.

Figure 2:
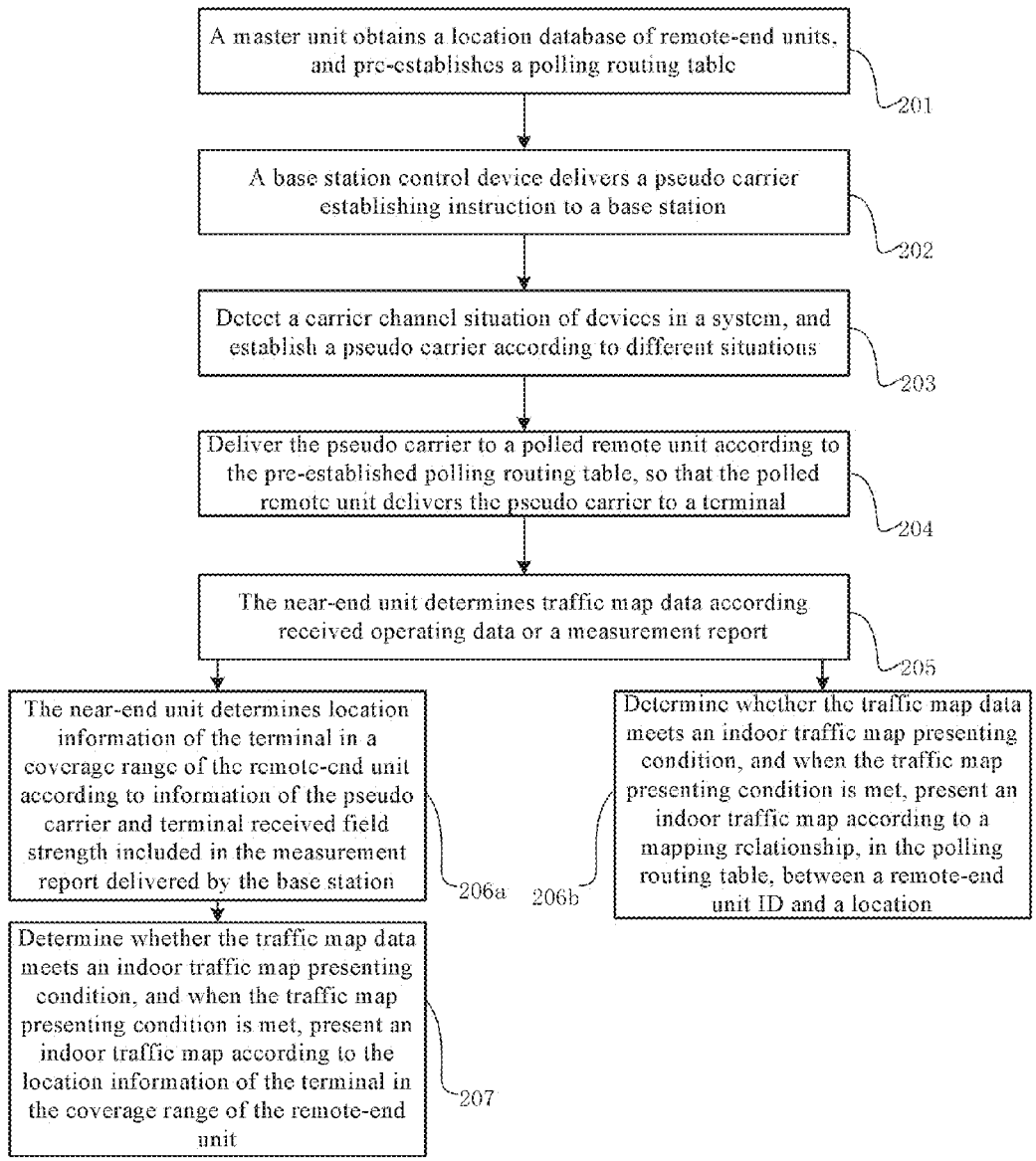
FIG. 2 is a flowchart of a method for presenting an indoor traffic map according to an embodiment of the present invention.

FIG. 2 is a flowchart of a method for presenting an indoor traffic map according to another embodiment of the present invention. As shown in FIG. 2, the embodiment includes the following steps:

Step 201: A master unit obtains a location database of remote units, and pre-establishes a polling routing table.

In the step, a near-end unit obtains the database of indoor distribution locations of remote units, and establishes the polling routing table according to location information of the remote units in the location database in combination with identity information of each remote unit. It should be understood that, as shown in FIG. 8, the polling routing table includes a correspondence between the near-end unit and the remote units, and optionally, when an expansion unit is included, includes a correspondence between the near-end unit, the expansion unit, and the remote units (these correspondences are implemented by using interface tables of the units), and the location information of the remote units and the identity information of the remote units.

Step 202: A base station control device delivers a pseudo carrier establishing instruction to a base station.

The base station control device may be a radio network controller (Radio Network Controller, RNC) or a base station controller (Base Station Controller, BSC), and the base station may be a base band unit (BBU) and a remote radio unit (RRU), or is a base transceiver station (Base Transceiver Station, BTS)/NodeB/eNodeB.

If the master unit itself establishes the pseudo carrier subsequently, the step may be omitted.

Step 203: Detect a carrier channel situation of devices in a system, and establish a pseudo carrier according to different situations.

If the master unit itself establishes the pseudo carrier, the carrier channel situation of the devices may not be detected. That is, the step may be omitted. If the previous step is initiated by the base station control device, the base station establishes a pseudo carrier after receiving the pseudo carrier establishing instruction, and delivers the pseudo carrier to the master unit.

In the step, the base station (including the BBU and the RRU) may firstly perform a self-test, to determine whether there is an extra carrier channel to establish the pseudo carrier, and if there is an extra carrier channel to establish the pseudo carrier, feed back readiness to the RNC or the BSC; a base station device instructs the master unit, to confirm whether there is an extra carrier channel to establish the pseudo carrier in the master unit, and if the master unit determines that there is an extra carrier channel, the master unit feeds back readiness to the base station device; the master unit instructs the expansion unit, to confirm whether there is an extra carrier channel to establish the pseudo carrier in the expansion unit, and if the expansion unit determines that there is an extra carrier channel, the expansion unit feeds back readiness to the master unit; and the expansion unit instructs the remote unit, to confirm whether there is an extra carrier channel to establish the pseudo carrier in the remote unit, and if the remote unit determines that there is an extra carrier channel, the remote unit feeds back readiness to the expansion unit. When all the foregoing four devices (three devices if there is no expansion unit) are ready, the pseudo carrier may be established. If any one of the devices is not ready, the devices return that the pseudo carrier cannot be established. After the foregoing processing, the base station (BBU/RRU), the master unit, the expansion unit, and the remote unit may establish the pseudo carrier through the carrier channel, and the remote unit is connected to a set terminal to form a radio link.

Step 204: The near-end unit delivers the pseudo carrier to a polled remote unit according to the pre-established polling routing table, so that the polled remote unit delivers the pseudo carrier to a terminal.

After establishing the polling routing table, the near-end unit may sequentially select each remote unit in the polling routing table as a polled remote unit, and deliver the pseudo carrier to the remote unit, so that the remote unit delivers the pseudo carrier to the terminal.

Step 205: The near-end unit determines traffic map data according to received operating data or a measurement report.

It should be understood that, the received measurement report returned by the terminal is a measurement report of a plurality of terminals, so the final obtained traffic map data refers to several pieces of information in network measurement information in measurement reports returned by a plurality of terminals in a coverage range of the same remote unit or data collected by the remote unit itself. For example, when presenting a weak-coverage indoor traffic map is required, a terminal received field strength size and terminal signal quality in the measurement report are determined to be the traffic map data; when presenting an interference indoor traffic map is required, received field strength size information of the remote unit and uplink spectrum information of the remote unit included in the collected operating data are determined to be the traffic map data; when presenting a traffic alarm indoor traffic map is required, a link-establishing traffic data statistic is obtained by calculation according to a terminal identity and information of the pseudo carrier in the measurement report, and the link-establishing traffic data statistic is determined to be the traffic map data; when presenting a pilot pollution traffic map is required, neighboring cell pilot signal strength in the measurement report is determined to be the traffic map data; and when presenting a signal leaking traffic map is required, neighboring base station pilot signal size information in the measurement report is determined to be the traffic map data.

When the near-end unit needs to present the weak-coverage, traffic alarm, and pilot pollution indoor traffic maps in the coverage area of the remote unit, the near-end unit further executes step 206*a*:

Step 206*a*: The near-end unit determines location information of the terminal in the coverage range of the remote unit according to the information of the pseudo carrier and terminal received field strength included in the measurement report delivered by the base station.

Figure 9:
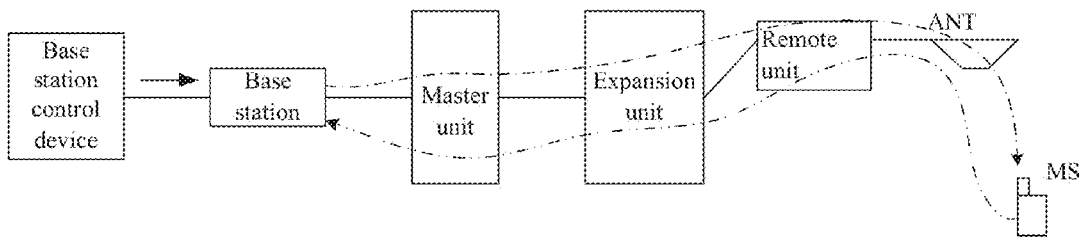
FIG. 9 is a schematic diagram of an indoor distribution system applied in an embodiment of the present invention.

Referring to FIG. 9, a process of a pseudo carrier establishing signal flow in the embodiment of the present invention is as follows: The base station control device initiates a pseudo carrier establishing instruction, where the pseudo carrier (different from a common carrier, the pseudo carrier only carries a pilot signal or a broadcast signal but does not carry a service signal, and the pseudo carrier may be demodulated at a mobile terminal and a power size thereof can be detected) does not carry a service signal. After receiving the instruction, the base station establishes a pseudo carrier, and delivers it to the master unit; the master unit delivers the pseudo carrier to the expansion unit; the expansion unit delivers the pseudo carrier to the remote unit; and then the remote unit transmits the pseudo carrier to a terminal MS. A signal flow fed back by the terminal is reversely transmitted to the base station through the remote unit, the expansion unit, and the master unit.

After initiating the pseudo carrier establishing instruction, the base station control device monitors an electrical level of the pseudo carrier fed back by the terminal, a signal-to-noise ratio (SNR, Signal/Noise) of the terminal, an electrical level of a neighboring cell pilot signal, and other parameters, and meanwhile, the base station control device requires the terminal not to perform a new carrier handover. After receiving the pseudo carrier establishing instruction from the base station control device, the base station establishes the pseudo carrier, and notifies the master unit that the carrier is a pseudo carrier, and the master unit polls the pseudo carrier according to the polling routing table; and meanwhile, the master unit instructs the expansion unit to poll the pseudo carrier (in a situation where the expansion unit is included). During a polling process, the remote unit has a wireless connection with the terminal, and the terminal returns the information of the pseudo carrier, so that whether the terminal is covered by the polled remote unit may be determined.

Because the pseudo carrier is sent by using the polled remote unit, when a terminal is covered by the polled remote unit, the measurement report reported by the terminal may include the information of the pseudo carrier, for example, pilot signal frequency channel number information. On the contrary, if a terminal is not covered by the polled remote unit, the measurement report reported by the terminal does not include the information of the pseudo carrier. Therefore, by using the information of the pseudo carrier in the reported measurement report, it may be determined whether a terminal is in the coverage range of the polled remote unit. For example, terminals A, B, and C belong to remote unit A.

Therefore, it should be noted that, because a database in an ACU of the near-end unit pre-stores associated data between remote units and physical locations, and the data information of the measurement report includes the information of the pseudo carrier after the measurement report is received, a location of the terminal may be determined by determining the remote unit that covers a set terminal. That is, the location of the terminal may be determined by polling a specific remote unit and location information according to the pseudo carrier. It should be noted that, when the RNC monitors received measurement report information such as the information of the pseudo carrier fed back by the link-established terminal, the information of the pseudo carrier refers to the pilot signal frequency channel number information where the pseudo carrier is located. Further, after the location of the remote unit to which the terminal belongs is confirmed, the terminal may be accurately displayed on an antenna arrangement diagram of an indoor distribution system. Accurate locations of these terminals on a traffic map are determined mainly according to terminal received field strength sizes in the coverage area of the polled remote unit. That is, if a terminal received field strength size and pilot signal frequency channel number information of a terminal covered by the remote unit are obtained, an accurate location of the terminal may be determined accurately. If a coverage radius of the remote unit is 10 m, the location of the terminal may be located within 300 square meters. When polling is performed by using the pseudo carrier, the pilot signal frequency channel number information is a marker, and only a pilot set of link-established terminals includes pseudo carrier signal frequency channel number information. The location of the terminal may be determined according to the location of the remote unit in the routing table, and then the accurate location of the terminal is obtained according to the terminal received field strength size. Therefore, the near-end unit may determine the location information of the terminal in the coverage range of the remote unit according to the information of the pseudo carrier included in the measurement report delivered by the base station. In addition, the accurate location of the terminal on the traffic map may be determined according to the received field strength size of the terminal.

Obtaining the accurate location of the terminal on the traffic map is a basis for presenting different types of indoor traffic maps. In this way, with the known accurate location of terminal, a corresponding location of the terminal may be displayed on the antenna arrangement diagram of the indoor distribution system by marking with different colors, to display different indoor traffic maps. The traffic map is displayed by randomly dotting in the coverage range of the remote unit. Presentation of an indoor traffic map described in the following embodiments also implies firstly obtaining the accurate location of the terminal on the traffic map and then presenting the indoor traffic map, and details are not described again.

Therefore, the near-end unit then executes the following step 207:

Step 207: Determine whether the traffic map data meets an indoor traffic map presenting condition, and when the traffic map presenting condition is met, present an indoor traffic map according to the location information of the terminal in the coverage range of the remote unit.

When the near-end unit needs to present uplink interference and signal leaking indoor traffic maps of the remote unit, after executing step 205, the near-end unit executes step 206b.

Step 206b: Determine whether the traffic map data meets an indoor traffic map presenting condition, and when the traffic map presenting condition is met, present an indoor traffic map according to a mapping relationship, in the polling routing table, between a remote unit identity and a location.

In this case, the near-end unit determines a first remote unit according to the established polling routing table, and delivers the pseudo carrier to the remote unit; the remote unit delivers the pseudo carrier to the terminal; the polled remote unit collects operating data and reports the operating data to the near-end unit; and the base station obtains the measurement report reported by the terminal and delivers the measurement report to the near-end unit, and this is the beginning of polling.

That is, the foregoing steps 201 to 206 are that the near-end unit collects a measurement report of a terminal in a coverage range of the remote unit and operating data of the remote unit, and then presents various traffic maps of the remote unit.

It should be understood that, after finishing the foregoing steps 201 to 206, the near-end unit continues to repeat the foregoing steps according to the polling routing table to collect traffic map data for a next remote unit until traffic map data of all remote units in the polling routing table is collected, so as to present a traffic map. In this case, a traffic map of all the remote units under the near-end unit may be displayed. It should be noted that, in the present invention, because the pseudo carrier can be established only when all devices (the near-end unit and the remote unit and/or the expansion unit) have an idle carrier channel, the indoor traffic map is presented for a remote unit in the polling routing table where the near-end unit and the remote unit and/or the expansion unit have a carrier channel for establishing the pseudo carrier.

Optionally, in the embodiment shown in FIG. 1 and FIG. 2, after the base station receives the measurement report, and the remote unit collects the operating data and uploads the operating data to the base station through a carrier channel between the near-end unit and the remote unit, the base station may determine the traffic map data, perform determination on the traffic map presenting condition, and present the traffic map, namely, the foregoing steps 102 to 104. Steps 205 and 206 may be executed by an operations and maintenance center (Operations and Maintenance Center, OMC) of the base station instead of the near-end unit.

For the foregoing indoor distribution system applied in FIG. 1 and FIG. 2, as shown in FIG. 9, the indoor distribution system is usually formed by a source and a distributed antenna system (Distributed Antenna System, DAS), where the source may be a base station, and the base station may be a base transceiver station (Base Transceiver Station, BTS)/NodeB/eNodeB, or may include a baseband unit (baseband unit, BBU) and a radio remote unit (remote radio unit, RRU). The DAS includes a near-end unit (namely, a master unit (master unit), which is also referred to as an access control unit (ACU, access control unit)), an expansion unit (namely, an expansion conversion unit (expansion conversion unit, ECU)), and a remote unit (namely, remote unit (remote unit), which is also referred to as an antenna radio terminal (ASR) an antenna ANT, and so on. It should be noted that, the expansion unit is an optional unit.

The master unit may implement access of multi-band multi-operator radio frequency RF signals, for example, access of RF signals of different modes such as CDMA, GSM, DCS, PCS, UMTS, LTE, and WLAN and different operators.

For a downlink, signals in a same band of a plurality of operators may be combined and input to the master unit, and the master unit performs down-conversion and analog-to-digital conversion for the signals, to form a multi-carrier digital channel in the master unit. Similarly, signals in other bands may be combined in the same combination manner, to form a multi-carrier digital channel in a digital domain. The digital channel may be variable according to an actual wideband of the carriers. All digital carrier channels may be output to one or more master unit output ports by using a logic switch matrix. Digital signals may be transmitted to the expansion unit or the remote unit according to a protocol, such as a Common Public Radio Interface protocol (CPRI) or an Open Base Station Architecture Initiative protocol (OBSAI). The master unit may not be cascaded or may be cascaded with another master unit.

The expansion unit may implement access of more remote units. Digital signals input from the master unit are unpacked in the expansion unit, and carrier channels are restored. The expansion unit may support a plurality of carrier channels, and by using a logic switch matrix, the plurality of carrier channels may output a carrier to a cascading interface and an interface connected to the remote unit. Digital signals may be transmitted to the remote unit according to a protocol, such as CPRI or OBSAI.

The remote unit implements up-conversion to convert digital signals of a plurality of operators into RF signals, and radiates the RF signals from an antenna port to the interior of a building.

For an uplink, mobile phone signals in a same band or different bands of a plurality of operators are coupled into a receiving channel of the remote unit via an antenna. Down-conversion and analog-to-digital conversion are performed for the signals, to form a multi-carrier digital channel in the remote unit. Digital signals may be transmitted to the expansion unit or the master unit according to a protocol, such as CPRI or OBSAI. The receiving channel of the remote unit may implement functions such as detection of the received field strength, and spectrum scanning.

Superposition is performed on same carriers of a plurality of remote units in the expansion unit or the master unit. Superposition processing is performed on same carrier signals of uplink signals of a plurality of expansion units in the master unit. In the master unit, digital up-conversion, digital-to-analog conversion, analog up-conversion, and amplification are performed for the signals, and then the signals are coupled to the base station by using a coupler.

The technical solutions of the embodiments of the present invention are further described below in detail. The terminal in the embodiments of the present invention may be, for example, a mobile phone, a PDA, a notebook computer, or a terminal of a different type. The embodiments use the terminal as an example but are not limited thereto.

Presentation of each traffic map is introduced below in detail.

The traffic map presented herein is for a terminal in a coverage range of a remote unit. That is, the traffic map is displayed by randomly dotting in the coverage range of the remote unit.

Figure 3:
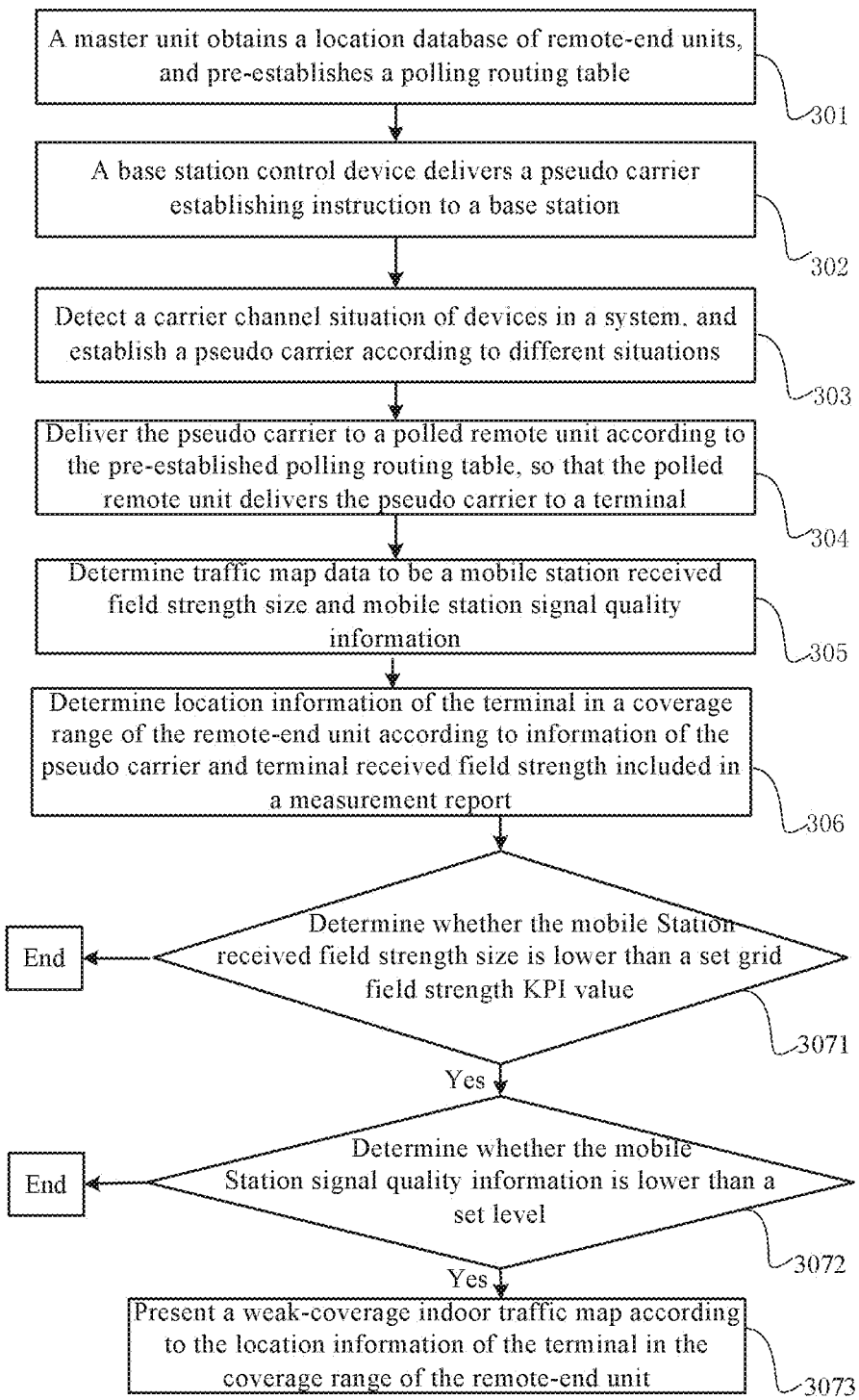
FIG. 3 is a flowchart of a method for presenting an indoor traffic map according to an embodiment of the present invention.

FIG. 3 is a flowchart of a method for presenting a weak-coverage indoor traffic map according to an embodiment of the present invention. As shown in the FIG. 3, the method for presenting an indoor traffic map according to the embodiment of the present invention is described mainly for presenting a weak-coverage traffic map. This embodiment is executed by a near-end unit of an indoor distribution system. The embodiment may include the following steps:

Step 301: A master unit obtains a location database of remote units, and pre-establishes a polling routing table.

Step 302: A base station control device delivers a pseudo carrier establishing instruction to a base station.

Step 303: Detect a carrier channel situation of devices in the system, and establish a pseudo carrier according to different situations.

Step 304: The near-end unit delivers the pseudo carrier to a polled remote unit according to the pre-established polling routing table, so that the polled remote unit delivers the pseudo carrier to a terminal.

Specific content of the foregoing steps 301 to 304 are the same as that of steps 201 to 204 in the foregoing embodiment, and details are not described again.

Step 305: The near-end unit determines traffic map data of the polled remote unit, where the traffic map data includes a mobile station received field strength size and mobile station signal quality information.

This embodiment is for presenting the weak-coverage indoor traffic map, so the near-end unit obtains the traffic map data after obtaining terminal information in a coverage range of the remote unit. A weak-coverage determining condition is: determining whether the received field strength size of the terminal in the coverage area of the remote unit is lower than a grid field strength key performance indicator (Key Performance Indicator, KPI) value of each grid divided in the area; and determining whether the terminal signal quality information is lower than a set level. In this case, the traffic map data is the terminal received field strength size of each terminal in a measurement report uploaded by the terminal in the coverage range, and the terminal signal quality information in the measurement report reported by each terminal. Relevant descriptions in the embodiment of FIG. 1 and FIG. 2 may be referenced for details.

Step 306: Determine location information of the terminal in the coverage range of the remote unit according to information of the pseudo carrier and terminal received field strength included in the measurement report delivered by the base station.

Details of a process of determining a location of the terminal in the coverage range of the remote unit are not described again, and specific descriptions in step 206a are referenced for details.

Therefore, in the embodiment, step 307 of determining whether the traffic map data meets the indoor traffic map presenting condition, and when the traffic map presenting condition is met, presenting the indoor traffic map according to the location information of the terminal in the coverage range of the remote unit specifically includes:

Step 3071: Sequentially determine whether the terminal received field strength size of each mobile terminal in the coverage area of the remote unit is lower than the grid field strength KPI value of each grid divided in the area.

Step 3072: Determine whether the terminal signal quality information is lower than the set level.

Step 3073: If both are lower, the weak-coverage determining condition in the traffic map presenting condition is met, and present a weak-coverage indoor traffic map according to the location information of the terminal in the coverage range of the remote unit.

Specifically, determination is performed on the obtained terminal received field strength size and terminal signal quality information of each terminal sequentially. For example, determination is performed on the two pieces of information of terminal A, and then determination is performed on the two pieces of information of terminal B, and if there are terminals meeting the weak-coverage determining condition, these terminals are marked. Therefore, according to determined accurate locations of the terminals on the traffic map, these terminals in the coverage area of the remote unit are presented on a field strength KPI grid graph of an antenna arrangement diagram of the indoor distribution system by, for example, dotting, marking with colors, or using light and dark colors. Therefore, an indoor traffic map representing that these terminals in the area are in weak coverage is formed.

The grid field strength KPI value may be a set KPI value, or may be obtained by calculation according to an indoor coverage propagation model and walk test data correction, which is specifically as follows:

The field strength KPI grid graph is drawn based on the antenna arrangement diagram of the indoor distribution system and WT data after construction and the indoor coverage propagation model; many small field strength grid points are formed by using grid subdivision; and correction is performed by using walk test (WT) data, to obtain a database of indoor field strength KPI distribution; and by using a correspondence between unique ID information on the remote unit and an indoor geographical location, information such as remote units whose antennasremote unit are near a window or which antennas are in a room may be clearly known.

The indoor coverage propagation model is:

$PL(d)=20*\log(f)+20*\log(d)-28$ dB$+L_{f(n)}+X_\sigma$, where f: a frequency f, in units of MHz;

d: a distance between a terminal and an antenna, in units of m; and $X_\delta$: a slow fading margin, whose value is related to a coverage probability requirement and an indoor slow fading standard deviation; and this data is corrected according to WT data.

$$L_{f(n)} = \sum_{i=0}^{n} P_i;$$

where $P_i$ represents a penetration loss of an $i^{th}$ partition wall; n is the number of partition walls; and PL(d) is a field strength KPI value of each antenna.

Therefore, for each grid, superposition of field strength KPI values of each antenna may be calculated by using different distances between terminals and antennas, to form a field strength KPI value of each grid.

For example, there are six antennas in a grid near a window, distances of the six antennas are calculated, field strength KPI values of each antenna are obtained by calculation by using the indoor coverage propagation model, and then these values are superposed to obtain a field strength KPI value at this grid, and an indoor field strength KPI value database is saved.

It should be noted that, an antenna location information database may also be saved according to the calculated field strength KPI values of each antenna. The antenna location information database replaces a remote unit location information database, and after polling by using a pseudo carrier, a location of a link-established mobile phone and all information reported by the terminal may also be known, and weak coverage, a traffic volume alarm, pilot pollution, and a mobile phone location are identified according to a determining condition.

Therefore, in the embodiment of the present invention, a near-end unit interacts with a remote unit, so that the remote unit sends a pseudo carrier to a terminal, and traffic map data, namely, a terminal received field strength size and terminal signal quality information, of a plurality of terminals in a coverage range of the remote unit is obtained by using the pseudo carrier, thereby implementing presentation of a weak-coverage indoor traffic map. Therefore, different from the prior art, there is no need to firstly obtain a measurement report of a terminal covered by an outdoor macro base station, and then obtain a traffic map in combination with all types of data such as a call history record, and there is no need to manually place indoors a pico base station or a terminal at a fixed point for collecting statistics to obtain a traffic map.

Figure 4:
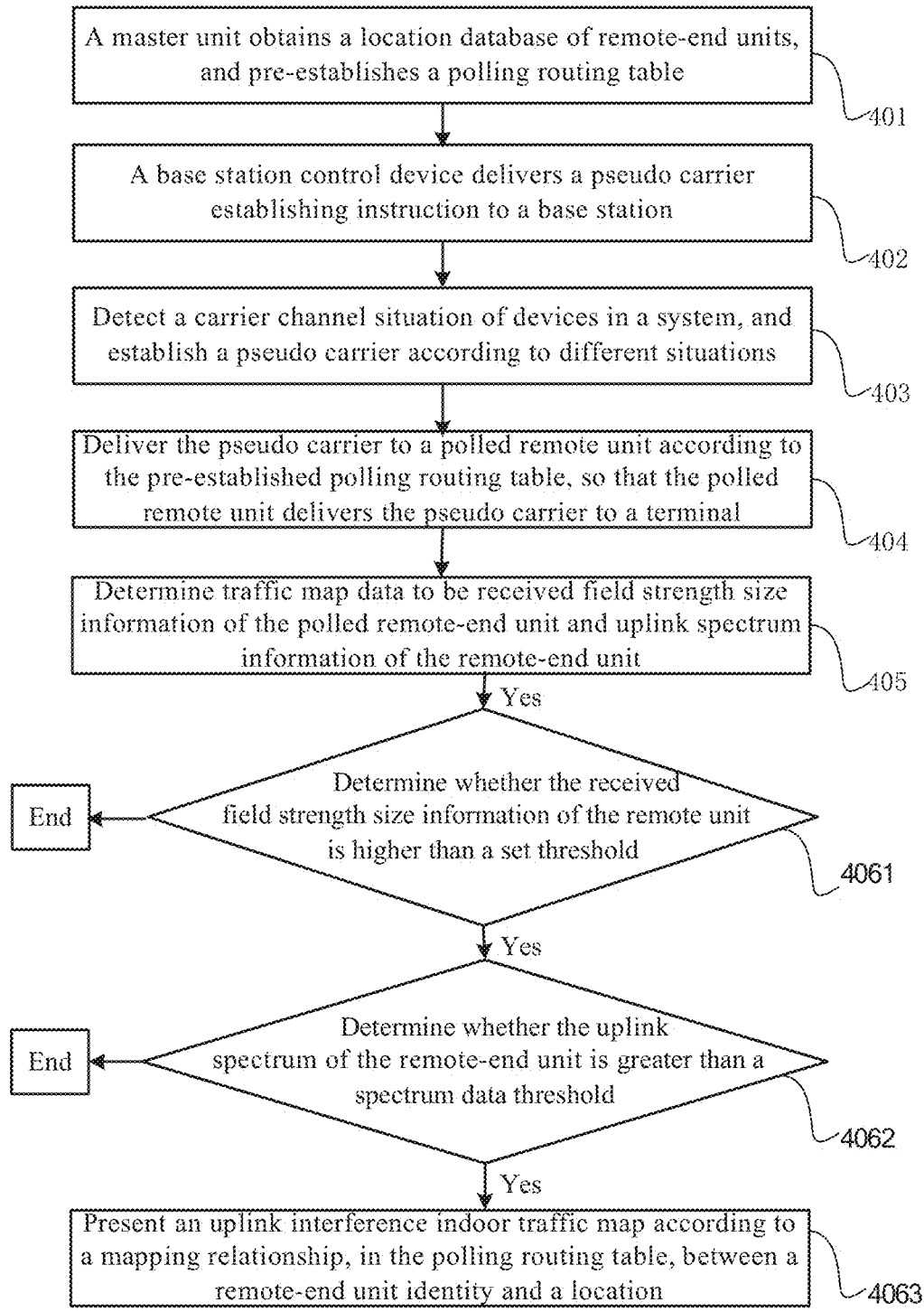
FIG. 4 is a flowchart of a method for presenting an indoor traffic map according to an embodiment of the present invention.

FIG. 4 is a flowchart of a method for presenting an indoor traffic map according to an embodiment of the present invention. As shown in FIG. 4, the method for presenting an indoor traffic map according to the embodiment of the present invention is mainly described for presenting an uplink interference traffic map. The embodiment may include the following steps:

Step 401: A master unit obtains a location database of remote units, and pre-establishes a polling routing table.

Step 402: A base station control device delivers a pseudo carrier establishing instruction to a base station.

Step 403: Detect a carrier channel situation of devices in a system, and establish a pseudo carrier according to different situations.

Step 404: The near-end unit delivers the pseudo carrier to a polled remote unit according to the pre-established polling routing table, so that the polled remote unit delivers the pseudo carrier to a terminal.

Specific content of the foregoing steps 401 to 404 is the same as that of steps 201 to 204 in the foregoing embodiment, and details are not described again.

Step 405: The near-end unit obtains traffic map data of the polled remote unit, where the traffic map data includes received field strength size information of the remote unit and uplink spectrum data of the remote unit.

This embodiment is for the uplink interference indoor traffic map, and an uplink interference determining condition is: determining whether the received field strength size information of the remote unit is higher than a set threshold; and determining whether the uplink spectrum data of the remote unit is higherhigher than a preset spectrum data threshold. Therefore, the traffic map data, namely, the received field strength size information of the remote unit and the uplink spectrum data of the remote unit, is obtained from operating data reported by the remote unit.

Therefore, in the embodiment, step 406 of determining whether the traffic map data meets an indoor traffic map presenting condition, and when the traffic map presenting condition is met, presenting an indoor traffic map according to a mapping relationship, in the polling routing table, between a remote unit identity and a location specifically includes:

Step 4061: Determine whether the received field strength size information of the remote unit is higher than the set threshold.

Step 4062: Determine whether the uplink spectrum data of the remote unit is higherhigher than the spectrum data threshold.

Step 4063: If both are higherhigher, the uplink interference determining condition in the traffic map presenting condition is met, and present an uplink interference indoor traffic map according to a mapping relationship, recorded in the polling routing table, between an indoor distribution location of each remote unit and a remote unit ID.

The remote unit and a location thereof may be further determined by using the mapping relationship, recorded in the polling routing table, between the remote unit ID and the location of the remote unit, and the remote unit is presented on an antenna arrangement diagram of an indoor distribution system by, for example, dotting, marking with colors, or using light and dark colors. For example, the location of the remote unit on the map is dotted in red, which indicates that the remote unit is in uplink interference.

Therefore, in the embodiment of the present invention, a near-end unit interacts with a remote unit, so that the remote unit sends a pseudo carrier to a terminal, and traffic map data, namely, a received field strength size of the remote unit and uplink spectrum data of the remote unit, is obtained by using the pseudo carrier, thereby implementing presentation of an uplink interference indoor traffic map. Therefore, different from the prior art, there is no need to firstly obtain a measurement report of a terminal covered by an outdoor macro base station, and then obtain a traffic map in combination with all types of data such as a call history record, and there is no need to manually place indoors a pico base station or a terminal at a fixed point for collecting statistics to obtain a traffic map.

Figure 5:
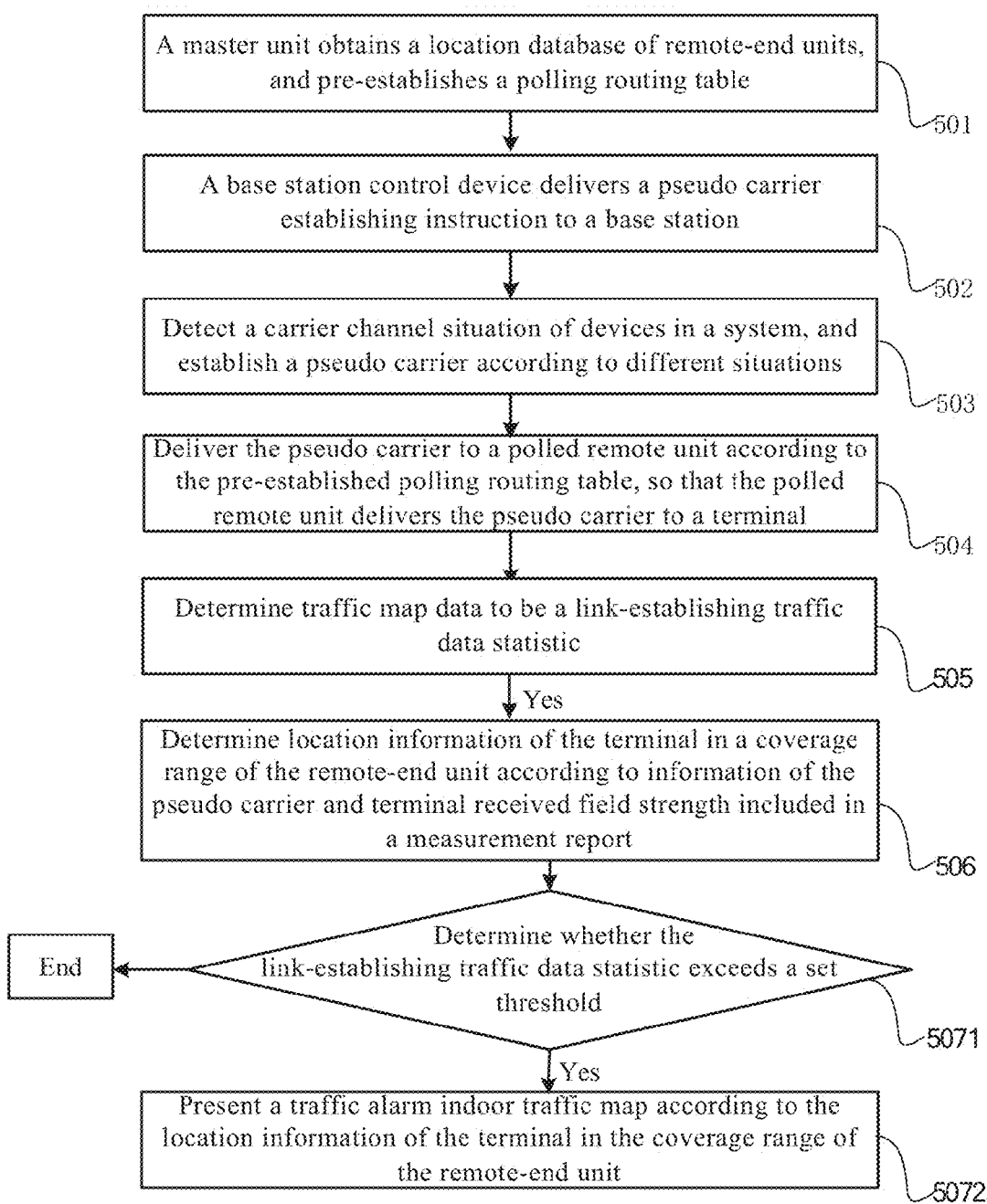
FIG. 5 is a flowchart of a method for presenting an indoor traffic map according to an embodiment of the present invention.

FIG. 5 is a flowchart of a method for presenting an indoor traffic map according to an embodiment of the present invention. As shown in FIG. 5, the method for presenting an indoor traffic map according to the embodiment of the present invention is mainly described for presenting a traffic alarm map. The embodiment specifically includes:

Step 501: A master unit obtains a location database of remote units, and pre-establishes a polling routing table.

Step 502: A base station control device delivers a pseudo carrier establishing instruction to a base station.

Step 503: Detect a carrier channel situation of devices in a system, and establish a pseudo carrier according to different situations.

Step 504: The near-end unit delivers the pseudo carrier to a polled remote unit according to the pre-established polling routing table, so that the polled remote unit delivers the pseudo carrier to a terminal.

Specific content of the foregoing steps 501 to 504 is the same as that of steps 201 to 204 in the foregoing embodiment, and details are not described again.

Step 505: The near-end unit determines traffic map data of the polled remote unit to be a link-establishing traffic data statistic.

This embodiment is for presenting a traffic alarm indoor traffic map, and a traffic alarm determining condition is: determining whether a link-establishing traffic data statistic exceeds a set threshold. In this case, the traffic map data is a link-establishing traffic data statistic.

It may be known from the described process of obtaining the link-establishing traffic data statistic that, according to identity information of the terminal included in the measurement report, the base station may be queried for a traffic volume corresponding to the identity information of the terminal, and traffic volumes of each terminal covered by the polled remote unit may be obtained; and then the master unit may add up traffic volumes of each terminal covered by the polled remote unit, or the traffic volumes of each terminal is used according to an algorithm specified in advance, to obtain a statistic traffic volume of the polled remote unit, namely, the link-establishing traffic data statistic.

Step 506: Determine location information of the terminal in a coverage range of the remote unit according to information of the pseudo carrier and terminal received field strength included in the measurement report delivered by the base station.

Therefore, in the embodiment, step 507 of determining whether the traffic map data meets the indoor traffic map presenting condition, and when the traffic map presenting condition is met, presenting the indoor traffic map according to the location information of the terminal in the coverage range of the remote unit specifically includes:

Step 5071: Determine whether a link-establishing traffic data statistic size exceeds the set threshold.

Step 5072: If the link-establishing traffic data statistic size exceeds the set threshold, the traffic alarm determining condition in the traffic map presenting condition is met, and present a traffic alarm indoor traffic map according to the location information of the terminal in the coverage range of the remote unit.

The presenting a traffic alarm indoor traffic map according to the location information of the terminal in the coverage range of the remote unit specifically includes: marking a traffic volume in the coverage range of the remote unit on the traffic map, and marking a remote unit with a link-establishing traffic data statistic size exceeding the set threshold and indicating insufficient capacity on the traffic map. It may be known from the foregoing descriptions that, because the terminal in the coverage range of the remote unit and its corresponding traffic volume are obtained in a process of obtaining the link-establishing traffic data statistic, traffic volumes in different locations under the remote unit may be directly displayed on the traffic map according to the location information of the terminal and the traffic volume, and the remote unit and the location thereof may be determined according to a mapping relationship, recorded in the polling routing table, between a remote unit ID and a location of the remote unit.

Specifically, traffic volumes in a coverage area of the remote unit are presented on an antenna arrangement diagram of an indoor distribution system according to locations of terminals by dotting, marking with colors, or using light and dark colors, to form a traffic distribution area. In addition, an area with a link-establishing traffic data statistic size, namely, an area of the remote unit, may further be shown by dotting, marking with colors, or using light and dark colors, to represent that capacity of the remote unit is insufficient and that it is necessary to add a carrier.

Therefore, in the embodiment of the present invention, a near-end unit interacts with a remote unit, so that the remote unit sends a pseudo carrier to a terminal, and traffic map data, namely, a link-establishing traffic data statistic including the pseudo carrier, in the coverage range of the remote unit is obtained by using the pseudo carrier, thereby implementing presentation of a traffic alarm indoor traffic map. Therefore, different from the prior art, there is no need to firstly obtain a measurement report of a terminal covered by an outdoor macro base station, and then obtain a traffic map in combination with all types of data such as a call history record, and there is no need to manually place indoors a pico base station or a terminal at a fixed point for collecting statistics to obtain a traffic map.

Figure 6:
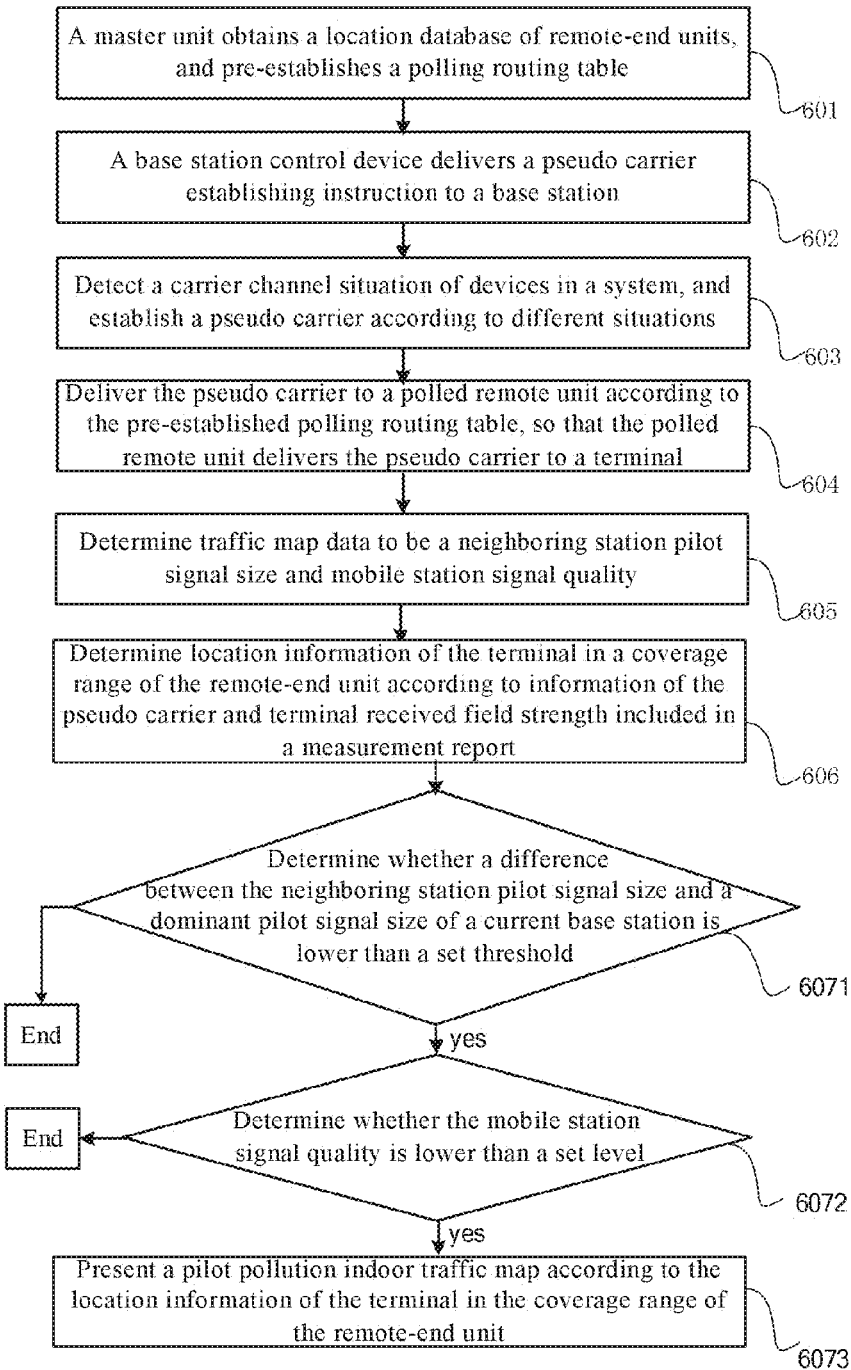
FIG. 6 is a schematic flowchart of a method for presenting an indoor traffic map according to an embodiment of the present invention.

FIG. 6 is a flowchart of a method for presenting an indoor traffic map according to an embodiment of the present invention. As shown in FIG. 6, the method for presenting an indoor traffic map according to the embodiment of the present invention is mainly described for presenting a pilot pollution indoor traffic map. The embodiment specifically includes the following steps:

Step 601: A master unit obtains a location database of remote units, and pre-establishes a polling routing table.

Step 602: A base station control device delivers a pseudo carrier establishing instruction to a base station.

Step 603: Detect a carrier channel situation of devices in a system, and establish a pseudo carrier according to different situations.

Step 604: The near-end unit delivers the pseudo carrier to a polled remote unit according to the pre-established polling routing table, so that the polled remote unit delivers the pseudo carrier to a terminal.

Specific content of the foregoing steps 601 to 604 is the same as that of steps 201 to 204 in the foregoing embodiment, and details are not described again.

Step 605: The near-end unit obtains traffic map data of the polled remote unit, where the traffic map data includes a neighboring base stationpilot signal size and terminal signal quality.

This embodiment is for presenting the pilot pollution indoor traffic map, so the near-end unit obtains the traffic map data after obtaining terminal information in a coverage range of the remote unit. A pilot pollution determining condition is: determining whether a difference between the neighboring base stationpilot signal size of the terminal in the coverage area of the remote unit and a dominant pilot signal size of a current base station is lower than a set threshold; and determining whether the terminal signal quality is lower than a set level. In this case, the traffic map data is the neighboring base stationpilot signal size and the terminal signal quality of the terminal in the coverage range of the remote unit.

Step 606: Determine location information of the terminal in a coverage range of the remote unit according to information of the pseudo carrier and terminal received field strength included in the measurement report delivered by the base station.

Therefore, in the embodiment, step 607 of determining whether the traffic map data meets the indoor traffic map presenting condition, and when the traffic map presenting condition is met, presenting the indoor traffic map according to the location information of the terminal in the coverage range of the remote unit specifically includes:

Step 6071: Determine whether the difference between the neighboring base stationpilot signal size and the dominant pilot signal size of the current base station is lower than the set threshold.

Step 6072: Determine whether the terminal signal quality is lower than the set level.

Step 6073: If both are lower, the pilot pollution determining condition in the traffic map presenting condition is met, and present a pilot pollution indoor traffic map according to location information of the terminal in the coverage range of the remote unit.

Specifically, determination is performed on the obtained neighboring base stationpilot signal and terminal signal quality information of each terminal sequentially. For example, determination is performed on the two pieces of information of terminal A, and then determination is performed on the two pieces of information of terminal B, and if there are terminals meeting the determining condition, these terminals are marked. Therefore, terminals meeting the foregoing condition in the coverage area of the remote unit are presented on an antenna arrangement diagram of an indoor distribution system according to determined accurate locations of the terminals on the traffic map, by, for example, dotting, marking with colors, or using light and dark colors, to form a pilot pollution indoor traffic map.

Therefore, in the embodiment of the present invention, a near-end unit interacts with a remote unit, so that the remote unit sends a pseudo carrier to a terminal, and traffic map data, namely, a neighboring base stationpilot signal size and terminal signal quality information, of a plurality of terminals in the coverage range of the remote unit is obtained by using the pseudo carrier, thereby implementing presentation of the pilot pollution indoor traffic map. Therefore, different from the prior art, there is no need to firstly obtain a measurement report of a terminal covered by an outdoor macro base station, and then obtain a traffic map in combination with all types of data such as a call history record, and there is no need to manually place indoors a pico base station or a terminal at a fixed point for collecting statistics to obtain a traffic map.

Figure 7:
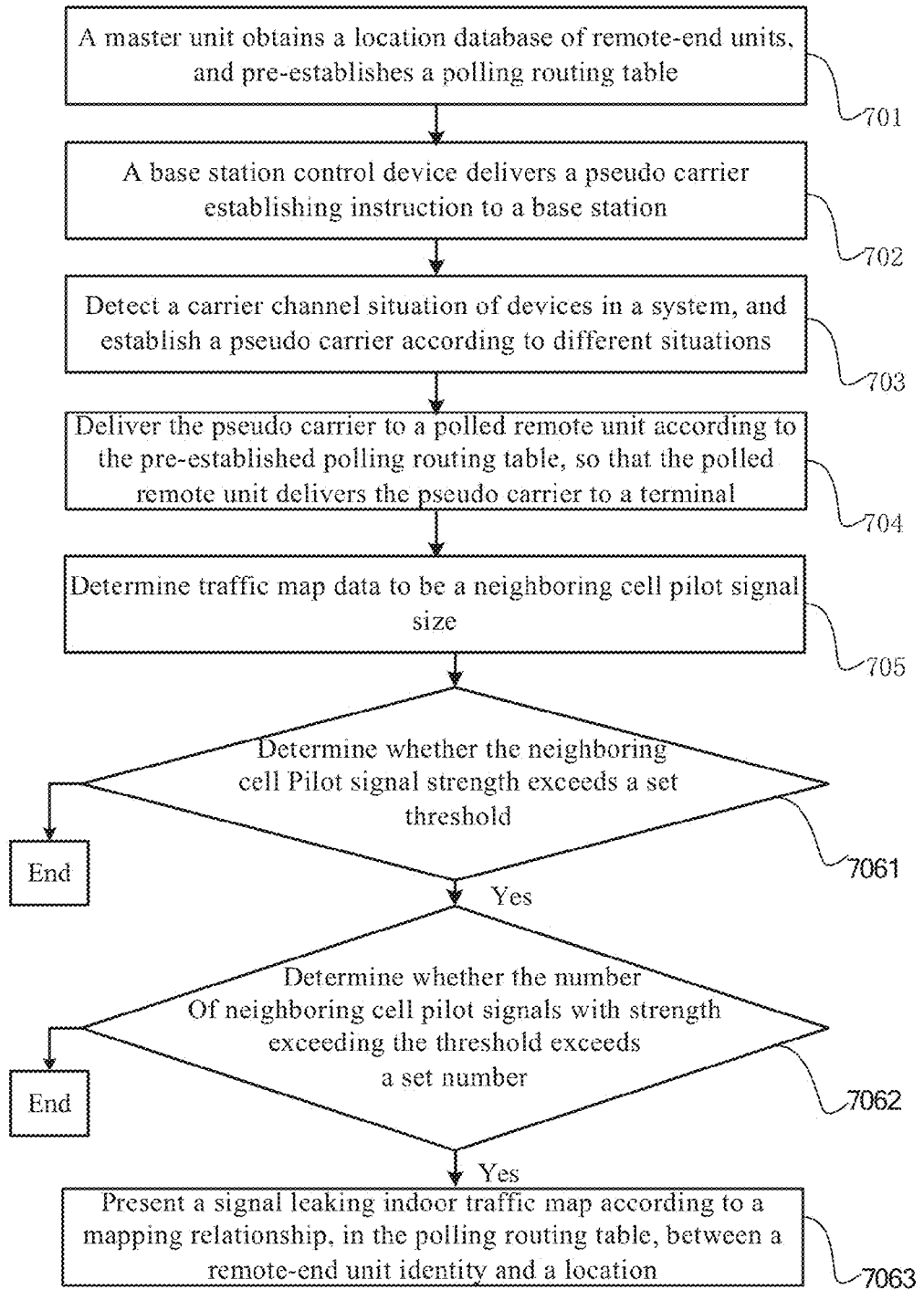
FIG. 7 is a schematic flowchart of a method for presenting an indoor traffic map according to an embodiment of the present invention.

FIG. 7 is a flowchart of a method for presenting an indoor traffic map according to an embodiment of the present invention. As shown in FIG. 7, the method for presenting an indoor traffic map according to the embodiment of the present invention is mainly for a signal leaking traffic map. The embodiment specifically includes the following steps:

Step 701: A master unit obtains a location database of remote units, and pre-establishes a polling routing table.

Step 702: A base station control device delivers a pseudo carrier establishing instruction to a base station.

Step 703: Detect a carrier channel situation of devices in a system, and establish a pseudo carrier according to different situations.

Step 704: The near-end unit delivers the pseudo carrier to a polled remote unit according to the pre-established polling routing table, so that the polled remote unit delivers the pseudo carrier to a terminal.

Specific content of the foregoing steps 701 to 704 is the same as that of steps 201 to 204 in the foregoing embodiment, and details are not described again.

Step 705: The near-end unit obtains traffic map data of the polled remote unit, where the traffic map data is neighboring cell pilot signal strength.

This embodiment is for presenting a signal leaking indoor traffic map, and a signal leaking determining condition in a traffic alarm determining condition is: determining whether the neighboring cell pilot signal strength of the terminal in the coverage area of the remote unit exceeds a set threshold, and whether the number of neighboring cell pilot signals with strength exceeding the threshold exceeds a set number. In this case, the traffic map data is neighboring cell pilot signal strength reported by the terminal in the coverage range of the remote unit.

Therefore, in the embodiment, step 706 of presenting an indoor traffic map according to a mapping relationship, in the polling routing table, between a remote unit identity and a location specifically includes:

Step 7061: Determine whether the neighboring cell pilot signal strength reported by the terminal exceeds the set threshold.

Step 7062: If the neighboring cell pilot signal strength exceeds the set threshold, determine whether the number of neighboring cell pilot signals with strength exceeding the threshold exceeds the set number.

The neighboring cell pilot signal reported by the terminal refers to a pilot signal sent by an outdoor macro base station that receives the pseudo carrier to the terminal. Specifically, the near-end unit determines whether neighboring cell pilot signal strength in measurement reports reported by a plurality of terminals in the coverage area of the remote unit exceeds the set threshold, and if the neighboring cell pilot signal strength exceeds the set threshold, statistics are collected to determine whether the number of the neighboring cell pilot signals with strength exceeding the set threshold exceeds the set number, and if the number of the neighboring cell pilot signals with strength exceeding the set threshold exceeds the set number, it indicates that signals of the remote unit are leaked.

Step 7063: If the number of neighboring cell pilot signals with strength exceeding the threshold exceeds the set number, the signal leaking determining condition in the traffic map presenting condition is met, and present a signal leaking indoor traffic map according to a mapping relationship, recorded in the polling routing table, between an indoor distribution location of each remote unit and a remote unit ID.

The remote unit and a location thereof may be further determined by using the mapping relationship, recorded in the polling routing table, between the remote unit ID and the location of the remote unit, and the remote unit is presented on an antenna arrangement diagram of an indoor distribution system by, for example, dotting, marking with colors, or using light and dark colors. For example, the location of the remote unit on the map is dotted in yellow, which indicates that antenna signals of the remote unit are leaked.

Therefore, in the embodiment of the present invention, a near-end unit interacts with a remote unit, so that the remote unit sends a pseudo carrier to a terminal, and traffic map data, namely, neighboring cell pilot signal strength of an outdoor macro base station, of a plurality of terminals in a coverage range of the remote unit is obtained by using the pseudo carrier, thereby implementing presentation of the signal leaking indoor traffic map. Therefore, different from the prior art, there is no need to firstly obtain a measurement report of a terminal covered by an outdoor macro base station, and then obtain a traffic map in combination with all types of data such as a call history record, and there is no need to manually place indoors a pico base station or a terminal at a fixed point for collecting statistics to obtain a traffic map.

Another embodiment of the present invention may include all steps in the foregoing embodiments. In the embodiment, weak-coverage, uplink interference, traffic alarm, pilot pollution, and signal leaking related to a remote unit are presented on a field strength KPI grid graph of an antenna arrangement diagram of an indoor distribution system, and a location of the terminal and a traffic distribution area are displayed on the traffic map.

In processes of the foregoing embodiments, a remote unit is polled according to a polling routing table by using a pseudo carrier to present a traffic map, and then a next remote unit is polled, and the foregoing process is repeated until all remote units are polled.

It should be noted that, in the foregoing process, if different remote units report terminal received field strength of a same terminal, a moving state of the terminal may be determined according to a size relationship of the terminal received field strength, and the moving state is shown on the antenna arrangement diagram of the indoor distribution system by dotting, marking with colors, or using light and dark colors.

In the present invention, a remote unit is polled by using a polling routing table, information of a terminal in a coverage range of the remote unit is obtained by using a pseudo carrier, and traffic map data is obtained according to a measurement report reported by the terminal and operating data collected by the remote unit, to present a traffic map of the remote unit. A location of the terminal, a traffic distribution area, a location where weak coverage occurs, and possible pilot pollution near a window and possible signal leaking may be accurately displayed on an indoor traffic map, and even locations where signal electrical levels are high but signal quality is poor are presented according to a terminal received field strength size and terminal signal quality. Therefore, the embodiments of the present invention implement presentation of all types of indoor traffic maps of a location where weak coverage occurs, pilot pollution near a window, signal leaking, and so on.

Figure 10:
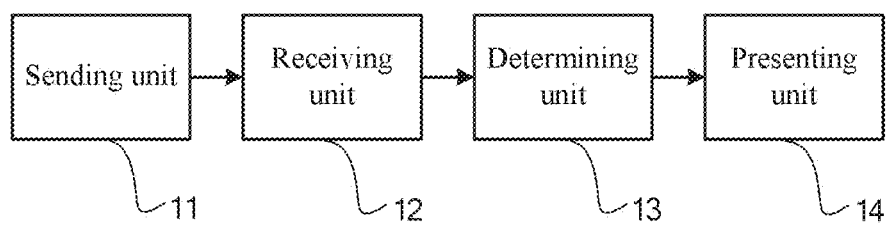
FIG. 10 is a schematic structural diagram of an apparatus for presenting an indoor traffic map according to an embodiment of the present invention.

The foregoing embodiments describe the methods for presenting an indoor traffic map, which may certainly be implemented by using an apparatus for presenting an indoor traffic map. FIG. 10 is a schematic diagram of an apparatus for presenting an indoor traffic map according to an embodiment of the present invention. As shown in FIG. 10, the apparatus for presenting an indoor traffic map according to this embodiment specifically includes:

The sending unit 11 is configured to send a pseudo carrier to a polled remote unit according to a pre-established polling routing table, so that the remote unit sends the pseudo carrier to a terminal.

Specifically, the sending unit 11 of the apparatus for presenting an indoor traffic map, for example, a near-end unit (or a master unit) may query a database that stores indoor distribution locations of remote units (or remote units), and establish the polling routing table according to the database in combination with identification numbers (IDs) of the remote units, where the polling routing table records a mapping relationship between an indoor distribution location of each remote unit and a remote unit ID. The polling routing table may indicate a sequence in which the remote units are polled, and then the pseudo carrier is sent to each polled remote unit according to the polling sequence. For detailed content of the routing table, reference may be made to FIG. 8.

The receiving unit 12 is configured to receive operating data collected by the remote unit and a measurement report sent by the terminal, where the measurement report includes information of the pseudo carrier.

The determining unit 13 determines traffic map data of the polled remote unit according to the measurement report or the collected operating data.

The measurement report may be reported by the terminal to a base station, and sent by the base station to the apparatus for presenting an indoor traffic map. The base station initiates measurement for the terminal by using an RNC, and feeds back the measurement report to the near-end unit. In addition to the information of the pseudo carrier reported by each terminal, the measurement report obtained by the RNC by measuring the terminal may further include network measurement information, for example, a received field strength size of a link-established terminal in a coverage area of each remote unit, terminal signal quality such as a signal-to-noise ratio (Signal Noise Radio, SNR) or chip energy/interference power density Ec/Io, neighboring cell pilot number, and neighboring base station pilot signal strength. Optionally, the measurement report may be reported by the terminal directly to the indoor traffic presenting apparatus.

Further, the measurement report may further include identity information of the terminal. A link-establishing traffic data statistic may be obtained by using the identity information of the terminal and the information of the pseudo carrier. The foregoing descriptions are referenced for a specific process of obtaining the link-establishing traffic data statistic.

The near-end unit sends the pseudo carrier to the polled remote unit according to the pre-established polling routing table, and also triggers the remote unit to collect operating data of the remote unit. The operating data collected by the remote unit includes: a received field strength size of the remote unit such as received total wideband power (RTWP), received signal strength (RSSI), and uplink spectrum data of the remote unit.

After receiving the pseudo carrier, the remote unit obtains statistic power which is analog-to-digital converted by a receiver of the remote unit, and converts a value of the statistic power into an antenna port, and sends received field strength (RSSI or RTWP) of the remote unit to the near-end unit by using the antenna port. The remote unit may also perform spectrum scanning on an idle carrier channel of the remote unit to obtain spectrum data, and then send the spectrum data to the indoor traffic presenting apparatus, such as a near-end unit, by using the antenna port. Thereby, the near-end unit obtains the received field strength (RSSI or RTWP) and the spectrum data of the remote unit from the antenna port.

The presenting unit 14 is configured to determine whether the traffic map data meets a traffic map presenting condition, and present an indoor traffic map when the traffic map presenting condition is met.

Further, when the apparatus for presenting an indoor traffic map is required to present weak-coverage, traffic alarm, and pilot pollution indoor traffic maps in the coverage area of the remote unit, the determining unit 13 is further configured to determine location information of the terminal in the coverage range of the remote unit according to the information of the pseudo carrier included in the measurement report; and the presenting unit 14 is further configured to determine whether the traffic map data meets a traffic map presenting condition, and when the traffic map presenting condition is met, present the indoor traffic map according to the location information of the terminal in the coverage range of the remote unit.

The sending unit 11 is further configured to deliver the pseudo carrier to the polled remote unit through a carrier channel between the near-end unit and the remote unit; or, the near-end unit delivers the pseudo carrier to the polled remote unit through a carrier channel between the near-end unit, an expansion unit, and the remote unit.

The presenting unit 14 performs determination on related traffic map data separately according to a weak-coverage determining condition, an uplink interference determining condition, a traffic alarm determining condition, a pilot pollution determining condition, and a signal leaking determining condition.

The weak-coverage determining condition is: determining whether a terminal received field strength size of a terminal in a coverage area of the remote unit is lower than a grid field strength key performance indicator (Key Performance Indicator, KPI) value of each grid divided in the area; and determining whether signal quality information of these terminals is lower than a set level.

The uplink interference determining condition is: determining whether received field strength size information of the remote unit is higher than a set threshold; and determining whether uplink spectrum data of the remote unit exceeds a spectrum data threshold.

The traffic alarm determining condition is: determining whether a link-establishing traffic data statistic exceeds a set threshold.

The pilot pollution determining condition is: determining whether a difference between a neighboring base stationpilot signal size of a terminal in a coverage area of the remote unit and a dominant pilot signal size of a current base station is lower than a set threshold; and determining whether terminal signal quality is lower than a set level.

The signal leaking determining condition is: determining whether neighboring cell pilot signal strength of the terminal in the coverage area of the remote unit exceeds a set threshold, and whether the number of neighboring cell pilot signals with strength exceeding the threshold exceeds a set number.

When all the foregoing conditions are met, for example, these terminals in the coverage area of the remote unit or the remote unit is presented on a field strength KPI grid graph of an antenna arrangement diagram of an indoor distribution system by dotting, marking with colors, or using light and dark colors.

Therefore, when the obtained traffic map data is received field strength size information of the remote unit and uplink spectrum data of the remote unit in the operating data, the presenting unit 14 is further configured to determine whether the received field strength size information of the remote unit is higher than the set threshold; determine whether the uplink spectrum data of the remote unit is higher than the spectrum data threshold; and if both are higher, the uplink interference determining condition in the traffic map presenting condition is met, and present an uplink interference indoor traffic map.

When the traffic map data is terminal received field strength information and terminal signal quality information in the measurement report, the presenting unit 14 is further configured to determine whether the terminal received field strength information of each terminal in the coverage range of the remote unit is lower than the grid field strength key performance indicator KPI value; determine whether the terminal signal quality information of each terminal in the coverage range of the remote unit is lower than the set level; and if both are lower, the weak-coverage determining condition in the traffic map presenting condition is met, and present a weak-coverage indoor traffic map according to the location information of the terminal in the coverage range of the remote unit.

When the traffic map data is a link-establishing traffic data statistic obtained by calculating a traffic volume of the terminal obtained according to a terminal identity in the measurement report, the presenting unit 14 is further configured to determines whether the link-establishing traffic data statistic exceeds the set threshold; and if the link-establishing traffic data statistic exceeds the set threshold, the traffic alarm determining condition in the traffic map presenting condition is met, and presents a traffic alarm indoor traffic map according to the location information of the terminal in the coverage range of the remote unit.

When the traffic map data is neighboring base stationpilot signal size information and terminal signal quality in the measurement report, the presenting unit 14 is further configured to determine whether a difference between the neighboring base stationpilot signal size of each terminal in the coverage range of the remote unit and the dominant pilot signal size is lower than the set threshold and whether the terminal signal quality of each terminal in the coverage range of the remote unit is lower than the set level; and if both are lower, the pilot pollution determining condition in the traffic map presenting condition is met, and present a pilot pollution indoor traffic map according to the location information of the terminal in the coverage range of the remote unit.

When the traffic map data is neighboring cell pilot signal strength in the measurement report, the presenting unit 14 is further configured to determine whether the neighboring cell pilot signal strength of each terminal in the coverage range of the remote unit exceeds the set threshold; and if the neighboring cell pilot signal strength of each terminal in the coverage range of the remote unit exceeds the set threshold, the signal leaking determining condition in the traffic map presenting condition is met, and present a signal leaking indoor traffic map.

It is understandable that: in the foregoing embodiment, the sending unit may be a transmitter, the receiving unit may be a receiver, and the determining unit and the presenting unit may be processors.

In the present invention, remote units are polled sequentially by using a polling routing table, a terminal in a coverage range of a remote unit is determined by using a pseudo carrier, operating data of the remote unit and network measurement information in a measurement report of the terminal are obtained as traffic map data, to perform representation of a traffic map. Therefore, there is no need to obtain a measurement report of a terminal covered by an outdoor macro base station to perform complex calculation, and there is no need to manually place indoors a pico base station or a terminal at a fixed point for collecting statistics to obtain a traffic map.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

In combination with the embodiments disclosed in this specification, method or algorithm steps may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

The foregoing specific embodiments clarify the objective, technical solutions, and benefits of the present invention in detail. It should be understood that the foregoing descriptions are merely specific embodiments of the present invention, but are not intended to limit the protection scope of the present invention. Any modification, equivalent replacement, or improvement made without departing from the principle of the present invention should fall within the protection scope of the present invention.

What is claimed is:

1. A method for presenting an indoor traffic map, wherein the method comprises:
   sending, by a master unit, including at least one processor, of an indoor distribution system, a pseudo carrier to a polled remote unit, including at least one processor, according to a pre-established polling routing table, so that the remote unit sends the pseudo carrier to a terminal;
   receiving operating data collected by the remote unit and a measurement report reported by the terminal, wherein the measurement report comprises information of the pseudo carrier;
   determining traffic map data of the polled remote unit according to the measurement report or the collected operating data; and
   determining whether the traffic map data meets a traffic map presenting condition by comparing the traffic map data to a threshold according to a type of the traffic map data, and presenting the indoor traffic map when the traffic map presenting condition is met,
   wherein the type of traffic map data is at least one of:
      received field strength size information of the remote unit and uplink spectrum data of the remote unit in the operating data,
      neighboring cell pilot signal strength in the measurement report,
      terminal received field strength information and terminal signal quality information in the measurement report,
      link-establishing traffic data statistic obtained by calculating a traffic volume of the terminal obtained according to a terminal identity and the information of the pseudo carrier in the measurement report, and
      neighboring base station pilot signal size information and terminal signal quality in the measurement report, and
   wherein the threshold is at least one of a set threshold, spectrum data threshold, set number, grid field strength key performance indicator KPI value, and set level.

2. The method for presenting an indoor traffic map according to claim 1, wherein before the determining whether the traffic map data meets a traffic map presenting condition, the method further comprises:
   determining location information of the terminal in a coverage range of the remote unit according to the information of the pseudo carrier and terminal received field strength information comprised in the measurement report; and
   the determining whether the traffic map data meets the traffic map presenting condition by comparing the traffic map data to the threshold according to the type of the traffic map data, and presenting the indoor traffic map when the traffic map presenting condition is met comprise:
   presenting the indoor traffic map according to the location information of the terminal in the coverage range of the remote unit.

3. The method for presenting an indoor traffic map according to claim 1, wherein
   the measurement report is reported by the terminal to a base station, and sent by the base station to the master unit.

4. The method for presenting an indoor traffic map according to claim 1, wherein the sending, by a master unit, a pseudo carrier to a polled remote unit comprises:
   delivering, by the master unit, the pseudo carrier to the polled remote unit through a carrier channel between the master unit and the remote unit; or
   delivering, by the master unit, the pseudo carrier to the polled remote unit through a carrier channel between the master unit, an expansion unit, including at least one processor, and the remote unit.

5. The method for presenting an indoor traffic map according to claim 1, wherein
   the type of traffic map data is received field strength size information of the remote unit and uplink spectrum data of the remote unit in the operating data, and
   the determining whether the traffic map data meets a traffic map presenting condition by comparing the traffic map data to the threshold according to the type of the traffic map data, and presenting an indoor traffic map when the traffic map presenting condition is met comprise:
      determining whether the received field strength size information of the remote unit is higher than the set threshold;
      determining whether the uplink spectrum data of the remote unit is higher than the spectrum data threshold; and
      if both are higher, an uplink interference determining condition in the traffic map presenting condition is met, and presenting an uplink interference indoor traffic map according to a mapping relationship, in the polling routing table, between a remote unit identity and a location.

6. The method for presenting an indoor traffic map according to claim 1, wherein
   the type of traffic map data is neighboring cell pilot signal strength in the measurement report, and
   the determining whether the traffic map data meets a traffic map presenting condition by comparing the traffic map data to the threshold according to the type of the traffic map data, and presenting an indoor traffic map when the traffic map presenting condition is met comprise:
      determining whether the neighboring cell pilot signal strength of each terminal in a coverage range of the remote unit exceeds the set threshold;
      determining whether the number of neighboring cell pilot signals with strength exceeding the threshold exceeds the set number; and
      if the number of neighboring cell pilot signals with strength exceeding the threshold exceeds the set number, a signal leaking determining condition in the traffic map presenting condition is met, and presenting a signal leaking indoor traffic map according to a mapping relationship, in the polling routing table, between a remote unit identity and a location.

7. The method for presenting an indoor traffic map according to claim 2, wherein
   the type of traffic map data is terminal received field strength information and terminal signal quality information in the measurement report, and
   the determining whether the traffic map data meets a traffic map presenting condition by comparing the traffic map data to the threshold according to the type of the traffic map data, and when the traffic map presenting condition is met, presenting the indoor traffic map according to the location information of the terminal in the coverage range of the remote unit comprise:

determining whether the terminal received field strength information of each terminal in the coverage range of the remote unit is lower than the grid field strength key performance indicator KPI value;

determining whether the terminal signal quality information of each terminal in the coverage range of the remote unit is lower than the set level; and if both are lower, a weak-coverage determining condition in the traffic map presenting condition is met, and presenting a weak-coverage indoor traffic map according to the location information of the terminal in the coverage range of the remote unit.

8. The method for presenting an indoor traffic map according to claim 7, wherein the key performance indicator KPI value is obtained by calculation according to an indoor coverage propagation model and walk test data correction, or is a preset KPI value.

9. The method for presenting an indoor traffic map according to claim 2, wherein the type of traffic map data is a link-establishing traffic data statistic obtained by calculating a traffic volume of the terminal obtained according to a terminal identity and the information of the pseudo carrier in the measurement report; and the determining whether the traffic map data meets a traffic map presenting condition by comparing the traffic map data to the threshold according to the type of the traffic map data, and when the traffic map presenting condition is met, presenting the indoor traffic map according to the location information of the terminal in the coverage range of the remote unit comprise:

determining whether the link-establishing traffic data statistic exceeds the set threshold; and if the link-establishing traffic data statistic exceeds the set threshold, a traffic alarm determining condition in the traffic map presenting condition is met, and presenting a traffic alarm indoor traffic map according to the location information of the terminal in the coverage range of the remote unit.

10. The method for presenting an indoor traffic map according to claim 2, wherein the type of traffic map data is neighboring base station pilot signal size information and terminal signal quality in the measurement report; and the determining whether the traffic map data meets a traffic map presenting condition by comparing the traffic map data to the threshold according to the type of the traffic map data, and when the traffic map presenting condition is met, presenting the indoor traffic map according to the location information of the terminal in the coverage range of the remote unit comprise:

determining whether a difference between a neighboring base station pilot signal size of each terminal in the coverage range of the remote unit and a dominant pilot signal size is lower than the set threshold;

determining whether the terminal signal quality of each terminal in the coverage range of the remote unit is lower than the set level; and if both are lower, a pilot pollution determining condition in the traffic map presenting condition is met, and presenting a pilot pollution indoor traffic map according to the location information of the terminal in the coverage range of the remote unit.

11. An apparatus for presenting an indoor traffic map, wherein the apparatus comprises:

a transmitter, configured to send a pseudo carrier to a polled remote unit, including at least one processor, according to a pre-established polling routing table, so that the remote unit sends the pseudo carrier to a terminal, including at least one processor;

a receiver, configured to receive operating data collected by the remote unit and a measurement report reported by the terminal, wherein the measurement report comprises information of the pseudo carrier;

a determining unit, including at least one processor configured to determine traffic map data of the polled remote unit according to the measurement report or the collected operating data; and a presenting unit, including at least one processor configured to determine whether the traffic map data meets a traffic map presenting condition by comparing the traffic map data to a threshold according to a type of the traffic map data, and present the indoor traffic map when the traffic map presenting condition is met, wherein the type of traffic map data is at least one of:

received field strength size information of the remote unit and uplink spectrum data of the remote unit in the operating data, neighboring cell pilot signal strength in the measurement report, terminal received field strength information and terminal signal quality information in the measurement report, link-establishing traffic data statistic obtained by calculating a traffic volume of the terminal obtained according to a terminal identity and the information of the pseudo carrier in the measurement report, and neighboring base station pilot signal size information and terminal signal quality in the measurement report, and wherein the threshold is at least one of a set threshold, spectrum data threshold, set number, grid field strength key performance indicator KPI value, and set level.

12. The apparatus for presenting an indoor traffic map according to claim 11, wherein the determining unit is further configured to:

determine location information of the terminal in a coverage range of the remote unit according to the information of the pseudo carrier comprised in the measurement report; and the presenting unit is further configured to present the indoor traffic map according to the location information of the terminal in the coverage range of the remote unit.

13. The apparatus for presenting an indoor traffic map according to claim 11, wherein the transmitter is further configured to deliver the pseudo carrier to the polled remote unit through a carrier channel between a master unit, including at least one processor, and the remote unit; or, the master unit is further configured to deliver the pseudo carrier to the polled remote unit through a carrier channel between the master unit, an expansion unit, including at least one processor, and the remote unit.

14. The apparatus for presenting an indoor traffic map according to claim 11, wherein the type of traffic map data is received field strength size information of the remote unit and uplink spectrum data of the remote unit in the operating data; and the presenting unit is further configured to
    determine whether the received field strength size information of the remote unit is higher than the set threshold;
    determine whether the uplink spectrum data of the remote unit is higher than the spectrum data threshold; and
    if both are higher, an uplink interference determining condition in the traffic map presenting condition is met, and present an uplink interference indoor traffic map according to a mapping relationship, in the polling routing table, between a remote unit identity and a location.

15. The apparatus for presenting an indoor traffic map according to claim 11, wherein
the type of traffic map data is neighboring cell pilot signal strength in the measurement report; and
the presenting unit is further configured to
    determine whether the neighboring cell pilot signal strength of each terminal in a coverage range of the remote unit exceeds the set threshold;
    determine whether the number of the neighboring cell pilot signals with strength exceeding the threshold exceeds the set number; and
    if the number of the neighboring cell pilot signals with strength exceeding the threshold exceeds the set number, a signal leaking determining condition in the traffic map presenting condition is met, and present a signal leaking indoor traffic map according to a mapping relationship, in the polling routing table, between a remote unit identity and a location.

16. The apparatus for presenting an indoor traffic map according to claim 12, wherein
the type of traffic map data is terminal received field strength information and terminal signal quality information in the measurement report; and
the presenting unit is further configured to
    determine whether the terminal received field strength information of each terminal in the coverage range of the remote unit is lower than the grid field strength key performance indicator KPI value;
    determine whether the terminal signal quality information of each terminal in the coverage range of the remote unit is lower than the set level; and
    if both are lower, a weak-coverage determining condition in the traffic map presenting condition is met, and present a weak-coverage indoor traffic map according to the location information of the terminal in the coverage range of the remote unit.

17. The apparatus for presenting an indoor traffic map according to claim 12, wherein
the type of traffic map data is a link-establishing traffic data statistic obtained by calculating a traffic volume of the terminal obtained according to a terminal identity in the measurement report; and
the presenting unit is further configured to
    determine whether the link-establishing traffic data statistic exceeds the set threshold; and
    if the link-establishing traffic data statistic exceeds the set threshold, a traffic alarm determining condition in the traffic map presenting condition is met, and present a traffic alarm indoor traffic map according to the location information of the terminal in the coverage range of the remote unit.

18. The apparatus for presenting an indoor traffic map according to claim 12, wherein
the type of traffic map data is neighboring base station pilot signal size information and terminal signal quality in the measurement report; and
the presenting unit is further configured to
    determine whether a difference between a neighboring base station pilot signal size of each terminal in the coverage range of the remote unit and a dominant pilot signal size is lower than the set threshold and whether the terminal signal quality of each terminal in the coverage range of the remote unit is lower than the set level; and
    if both are lower, a pilot pollution determining condition in the traffic map presenting condition is met, and present a pilot pollution indoor traffic map according to the location information of the terminal in the coverage range of the remote unit.

* * * * *